United States Patent
Eriksson et al.

(10) Patent No.: US 10,461,912 B2
(45) Date of Patent: Oct. 29, 2019

(54) DYNAMICAL SEARCH SPACE ALTERATIONS

(71) Applicant: Telefonaktiebolaget LM Ericsson (publ), Stockholm (SE)

(72) Inventors: Erik Eriksson, Linköping (SE); Jonas Fröberg Olsson, Ljungsbro (SE); Martin Hessler, Linköping (SE); Pål Frenger, Linköping (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 15/106,682

(22) PCT Filed: Apr. 20, 2016

(86) PCT No.: PCT/SE2016/050346
§ 371 (c)(1),
(2) Date: Jun. 20, 2016

(87) PCT Pub. No.: WO2017/065666
PCT Pub. Date: Apr. 20, 2017

(65) Prior Publication Data
US 2017/0264417 A1 Sep. 14, 2017

Related U.S. Application Data

(60) Provisional application No. 62/240,873, filed on Oct. 13, 2015.

(51) Int. Cl.
*H04L 5/00* (2006.01)
*H04W 72/04* (2009.01)

(52) U.S. Cl.
CPC .......... *H04L 5/0096* (2013.01); *H04L 5/0053* (2013.01); *H04W 72/042* (2013.01)

(58) Field of Classification Search
CPC ........................ H04L 5/0096; H04W 72/042
(Continued)

(56) References Cited

U.S. PATENT DOCUMENTS

| | | | |
|---|---|---|---|
| 2012/0163437 A1* | 6/2012 | Frederiksen | H04L 5/001 375/224 |
| 2013/0039291 A1* | 2/2013 | Blankenship | H04L 5/001 370/329 |

(Continued)

OTHER PUBLICATIONS

International Search Report and Written Opinion for International Patent Application No. PCT/SE2016/050346, dated Jul. 15, 2016, 13 pages.
(Continued)

*Primary Examiner* — Chi Tang P Cheng
(74) *Attorney, Agent, or Firm* — Withrow & Terranova, PLLC

(57) ABSTRACT

There is disclosed a method performed by a wireless device for updating an allocated search space for downlink control information. A corresponding wireless device is also disclosed. There is also disclosed a method performed by a radio network node to enable a wireless device served by the radio network node to perform an update of a search space allocated to the wireless device to monitor for downlink control information. Also provided is a corresponding radio network node. Corresponding computer programs and apparatuses are also disclosed. One particular advantage of the disclosed is that it enables a more tailor made search space for a wireless device.

19 Claims, 16 Drawing Sheets

(58) Field of Classification Search
USPC .......................................................... 370/329
See application file for complete search history.

(56) References Cited

U.S. PATENT DOCUMENTS

2013/0163543 A1* 6/2013 Freda ................ H04W 72/0406
370/329
2014/0050191 A1* 2/2014 Kim ........................ H04L 5/001
370/329
2014/0119335 A1 5/2014 Wang et al.

OTHER PUBLICATIONS

Author Unknown, "Technical Specification Group Radio Access Network; Evolved Universal Terrestrial Radio Access (E-UTRA) Medium Access Control (MAC) protocol specification (Release 8)," Technical Specification 36.321, Version 8.0.0, 3GPP Organizational Partners, Dec. 2007, 23 pages.

* cited by examiner

DYNAMICAL SEARCH SPACE ALTERATIONS

This application is a 35 U.S.C. § 371 national phase filing of International Application No. PCT/SE2016/050346, filed Apr. 20, 2016, which claims the benefit of Provisional Application No. 62/240,873, filed Oct. 13, 2015, the disclosures of which are incorporated herein by reference in their entireties.

TECHNICAL FIELD

The proposed technology generally relates to a method performed by a wireless device for updating an allocated search space for downlink control information. It also relates to a corresponding wireless device. The proposed technology also provides a method performed by a radio network node to enable a wireless device served by the radio network node to perform an update of a search space allocated to the wireless device to monitor for downlink control information. Also provided is a corresponding radio network node. Corresponding computer programs and apparatuses are also disclosed.

BACKGROUND

In wireless communication network the format in which the data is communicated between network nodes is transmitted as control information in a specified and known way. The receiving node, which might, for example, be a UE in a LTE network, first decodes the control information, which may be a grant, that contains information on the transport format of the transmitted downlink data or the data to be transmitted, uplink data. A particular example of the formatting information is the allocation, that is, where the data is located, typically in frequency. Another example relates to the number of layers used, still another example relates the modulation and coding information. In LTE networks, the grant is transmitted on PDCCH or ePDCCH using a variety of DCI formats which are specific to different operating modes of the UE. For example, in the random access procedure the eNB when sending a random access response to the UE the eNB uses DCI format 1A. The eNB uses this format since this is known to all UEs and the eNB does not know the actual capabilities of the UE when sending the random access response. Later in the call setup procedure the eNB learn the UE capabilities and can start using a more advanced DCI format. A grant received on PDCCH/ePDCCH is relative a specific subframe (except semi-persistent grants that are relative multiple subframes), wherein for downlink, DL, grant specific to same subframe n in which the grant was detected while for uplink, UL, grants is specific to a future subframe n+a, where usually a=4.

In legacy state-of-the art systems such as LTE the physical downlink control channel, also referred to as PDCCH, supports multiple formats and the format used is a priori unknown to the terminal. Therefore the terminal needs to blindly detect the format used on the downlink control channel in order to receive the downlink control information, DCI. In addition the PDCCH is a shared channel in which several terminals can be scheduled in the same transmission time interval, TTI, and the UE/wireless device does not a priori know where in the PDCCH it will find the DCI.

The theoretical maximum amount of blind decoding attempts that would be needed for a terminal to find any possible DCI of any size and location is typically much larger than the number of blind decoding attempts that the terminal is capable of performing in a TTI. Hence it is required to have mechanisms that limit possible DCI sizes and location that the terminal is supposed to monitor. Clearly, from a scheduling point of view, restrictions on how the PDCCH may be used are undesirable and may influence the scheduling flexibility and impose additional processing at the transmitter side. At the same time, requiring the terminal to monitor all possible DCI locations and sizes is not attractive from a terminal complexity point of view.

To impose as few restrictions as possible on the scheduler while at the same time limit the maximum number of blind decoding attempts in the terminal, LTE defines so called search spaces which describe where in the downlink control channel the terminal is supposed to monitor for downlink control information.

To clarify, it is possible to consider such a search space as a set of candidate control channels formed by for examples CCEs, control channel elements, on a specified aggregation level. Allocation of resources may thus be performed by means of such CCEs, control channel elements. The allocated or assigned search space is supposed to be decoded by a terminal, or a wireless device, in order to obtain downlink control information. There exist in general multiple aggregation levels, corresponding to two, four and eight CCEs, and it therefore exist multiple search spaces for each terminal or wireless device. The terminal attempts, in each sub-frame and for each search space, to decode all PDCCHs that can be formed from the CCEs. Therefore, if the CRC is valid for a blind decoding attempt the corresponding control channel is also considered valid for the terminal or wireless device and the terminal or wireless device will process the corresponding information. This information will in general concern scheduling information such as scheduling assignments, scheduling grants and alike. An efficient utilization of CCEs makes use of terminal specific search spaces at each aggregation level, that is, a search space specifically allocated to a particular terminal or wireless device. In several situations there is also a need to address a group of terminals in the system and for this purpose LTE has defined common search spaces in addition to the terminal specific search spaces. Common search spaces are for example used when scheduling system information valid for all terminals in the system while terminal specific search spaces are typically used to communicate downlink assignment and uplink grants.

Despite the efforts already made for providing an efficient and flexible scheduling there still exists a need for improvements that could provide even better flexibility as well as a faster way of identifying and decoding relevant control information. If it would be possible to provide mechanisms whereby a wireless device is provided with means to, e.g., more quickly identify relevant control information, this would in turn free a lot a transmit resources which would enable a more efficient use of physical channels for data transmissions. This would ultimately improve the overall throughput of the network system. The proposed technology aims to provide such mechanisms.

SUMMARY

It is an object of the proposed technology to provide mechanisms that provide improved search space handling. It is another object to provide mechanisms that enables a reduced use of physical control channels for conveying downlink control information. Such mechanisms would make it possible to reduce the dimensioning of physical control channels and more resources could as a consequence be allocated to physical data channels PDCHs. This would, if achieved, in turn enable an increased system throughput. Such mechanisms would also enable an efficient data control information exchange between the network nodes even in the scenario where beamforming is used.

These and other objects are met by embodiments of the proposed technology.

According to a first aspect, there is provided a method performed by a wireless device for updating an allocated search space for downlink control information. The method comprises the step of obtaining, from a downlink control information message, information specifying an alteration of the search space to monitor for downlink control information, DCI, The method also comprises the step of determining an updated search space based on the allocated search space and the specified alteration of the search space.

According to a second aspect, there is provided a method performed by a radio network node to enable a wireless device served by the radio network node to perform an update of a search space allocated to the wireless device to monitor for downlink control information. The method comprises the step of determining an alteration of the search space allocated to the wireless device. The method also comprises the step of communicating a downlink control information message to the wireless device, where the downlink control information message comprises information specifying the alteration of the search space to enable the wireless device to update its allocated search space.

According to a third aspect, there is provided a wireless device configured to update an allocated search space for downlink control information. The wireless device is configured to obtain, from a downlink control information message, information specifying an alteration of the search space to monitor for downlink control information, DCI. The wireless device is also configured to determine an updated search space based on the allocated search space and the specified alteration of the search space.

According to a fourth aspect, there is provided a radio network node configured to enable a wireless device served by the radio network node to perform an update of a search space allocated to the wireless device to monitor for downlink control information. The radio network node is configured to determine an alteration of the search space allocated to the wireless device. The radio network node is also configured to communicate a downlink control information message to the wireless device where the downlink control information message comprises information specifying the alteration of the search space to enable the wireless device to update its allocated search space According to a fifth aspect there is provided a computer program for performing, when executed by at least one processor, an update of an allocated search space for downlink control information, the computer program comprises instructions, which when executed, cause the at least one processor to:

read information relating to a specified alteration of the search space to monitor for downlink control information, DCI;

determine, based on the read information, an updated search space based on the allocated search space and the specified alteration of the search space.

According to a sixth aspect there is provided a computer program for performing, when executed by at least one processor, an update of a search space for downlink control information allocated to a wireless device, the computer program comprises instructions, which when executed, cause the at least one processor to:

determine an alteration of the search space allocated to the wireless device;

output information specifying the alteration of the search space to be embedded in message to be communicated to the wireless device to enable the wireless device to update its allocated search space.

According to a seventh aspect there is provided an apparatus for updating a search space for downlink control information allocated to a wireless device. The apparatus comprises a reading module for reading information specifying an alteration of the search space to monitor for downlink control information DCI. The apparatus also comprises a processing module for determining an updated search space based on the allocated search space and the obtained alteration of the search space.

According to an eight aspect there is provided an apparatus to enable a wireless device to perform an update of a search space allocated to the wireless device to monitor for downlink control information. The apparatus comprises a processing module for determining an alteration of the search space allocated to the wireless device. The apparatus also comprises an output module for generating information to be communicated to the wireless device specifying the alteration of the search space to the wireless device to enable the wireless device to update its allocated search space.

An advantage of the proposed technology is that it enables a more tailor made search space for each wireless device. Such tailor made, or user specific, search spaces would reduce the amount of blind decoding that a wireless device need to perform to obtain downlink control information. One reason underlying the fact that the search space can be reduced is that there is no need to perform blind decoding attempts in order to support user multiplexing on the control channel. The wireless device knows that if it is scheduled it will find the DCI first in the tailor made user specific search space. On a shared control channel the network node/scheduler may instead have scheduled a DCI to another wireless device on that location.

Another advantage of the proposed technology is that it enables an efficient use of the scarce radio resources due to the fact that it makes it possible to transmit downlink control information in already granted downlink data transmissions instead of straining the physical control channels. That is, by extending the search space to also include locations in a message received on a downlink data channel, a more direct way is opened for communicating downlink control information to a wireless device. This is particularly useful when it comes to beam-formed transmissions since a radio network node may be able to convey downlink control information in a message transmitted over device optimized, e.g. beam-formed towards a particular UE, set of radio resources such as a scheduled physical data channel instead of a shared control channel.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1A:
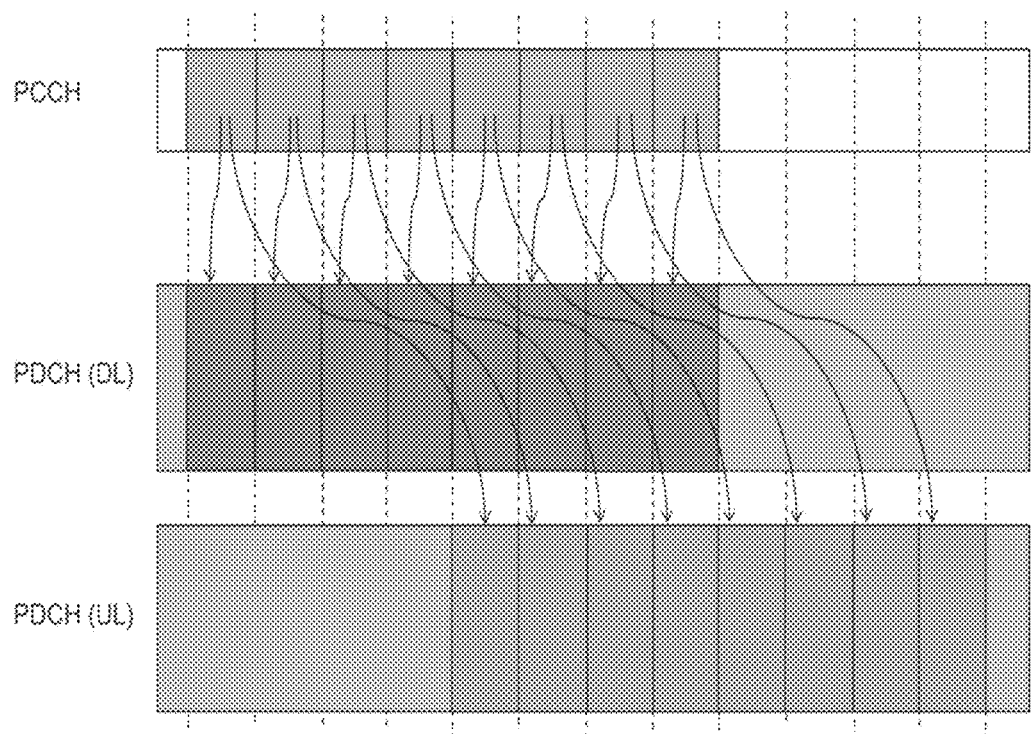
FIG. 1a is a schematic illustration of data transmissions relating to a specific UE in a FDD system. The arrows illustrate which DL respective UL transmission respective grant transmitted on the control channel PCCH relate to. Here a=4 is illustrated, i.e. an uplink grant provided on the PCCH in sub-frame n is valid for uplink transmission in sub-frame n+4

For a better understanding of the proposed technology, it may be useful to begin with a brief overview of general technical field wherein the proposed technology may be applied. FIG. 1a provides an illustration of data transmissions relating to a specific wireless device in a FDD system. It is illustrated a frequency division duplex system, FDD system, with a downlink physical control channel, PCCH, and two physical data channels, PDCHs, one for downlink, DL, and one for uplink, UL. As illustrated one DL and one UL grant is transmitted in each sub-frame during the session in which a wireless device, such as a user equipment, UE, has data. Note that a downlink grant may also be referred to as a downlink assignment. The scenario illustrated is a DL data session wherein the UE has downlink data to be received for 8 sub-frames. The UL grants are present for the UE to provide HARQ feedback, and possibly also CSI feedback and higher layer feedback, to the eNodeB. The arrows in FIG. 1 illustrate which DL respective UL transmission respective grant transmitted on the control channel PCCH relate to. Here a=4 is illustrated, i.e. an uplink grant provided on the PCCH in sub-frame n is valid for uplink transmission in sub-frame n+4.

As has been mentioned earlier, in legacy state-of-the art systems such as LTE the physical downlink control channel supports multiple formats and the format that is used is a priori unknown to the terminal. To receive the downlink control information, DCI, the terminal needs to blindly detect the format that is used on the downlink control channel. To impose as few restrictions as possible on the scheduler while at the same time limit the maximum number of blind decoding attempts in the terminal, LTE defines so called search spaces which describe where in the downlink control channel the terminal is supposed to monitor for downlink control information The particular downlink control information that is decoded in the terminal specific search space may be any of a number of different DCI formats. In LTE, Long Term Evolution, DCI format 0 is in particular used for uplink allocation. Other formats are instead used for allocating the resources in the downlink. Some examples are given by the following non-exhaustive list of DCI formats:

DCI Format 1 is used for downlink allocation of resources for Single Input Multiple Output (SIMO) case.

DCI Format 1A is either used for downlink allocation of resources for SIMO operation or for allocating a dedicated preamble signature to a wireless device for random access purposes DCI Format 1B is used for transmission control information of Multiple Input Multiple Output (MIMO).

DCI Format 10 is used for highly compact transmissions of PDSCH assignment.

Format 1D is basically the same as format 1B above, but where additional information in the form of power offset is provided.

The size of the terminal specific search space is in general dependent on the number of control message sizes that needs to be supported, the amount of link adaptation that is required, and how many terminals one want to be able to simultaneously multiplex on the downlink control channels.

It is an objective of the proposed technology to provide mechanisms whereby the size of a search space allocated to a terminal in the system may be limited. This is done by defining a first search space, or an initially allocated search space, which may in principle be done as is done in LTE today. This first or initially allocated search space may then be dynamically altered using the mechanisms described in this disclosure. The dynamically extended search space can be made small compared to the size of the maximum possible search space since the need for multiplexing of several terminals can be solved by assigning different terminals with different dynamically extended search spaces. The proposed technology also provides for the possibility to make the first or initially allocated search space smaller than is currently done in LTE since fewer users need to share the search space and hence the need to multiplex many users on the first search space is reduced. The dynamically extended search space can further utilize radio resources in an optimized way, e.g. by means of terminal specific beamforming, for each particular terminal.

Figure 2:
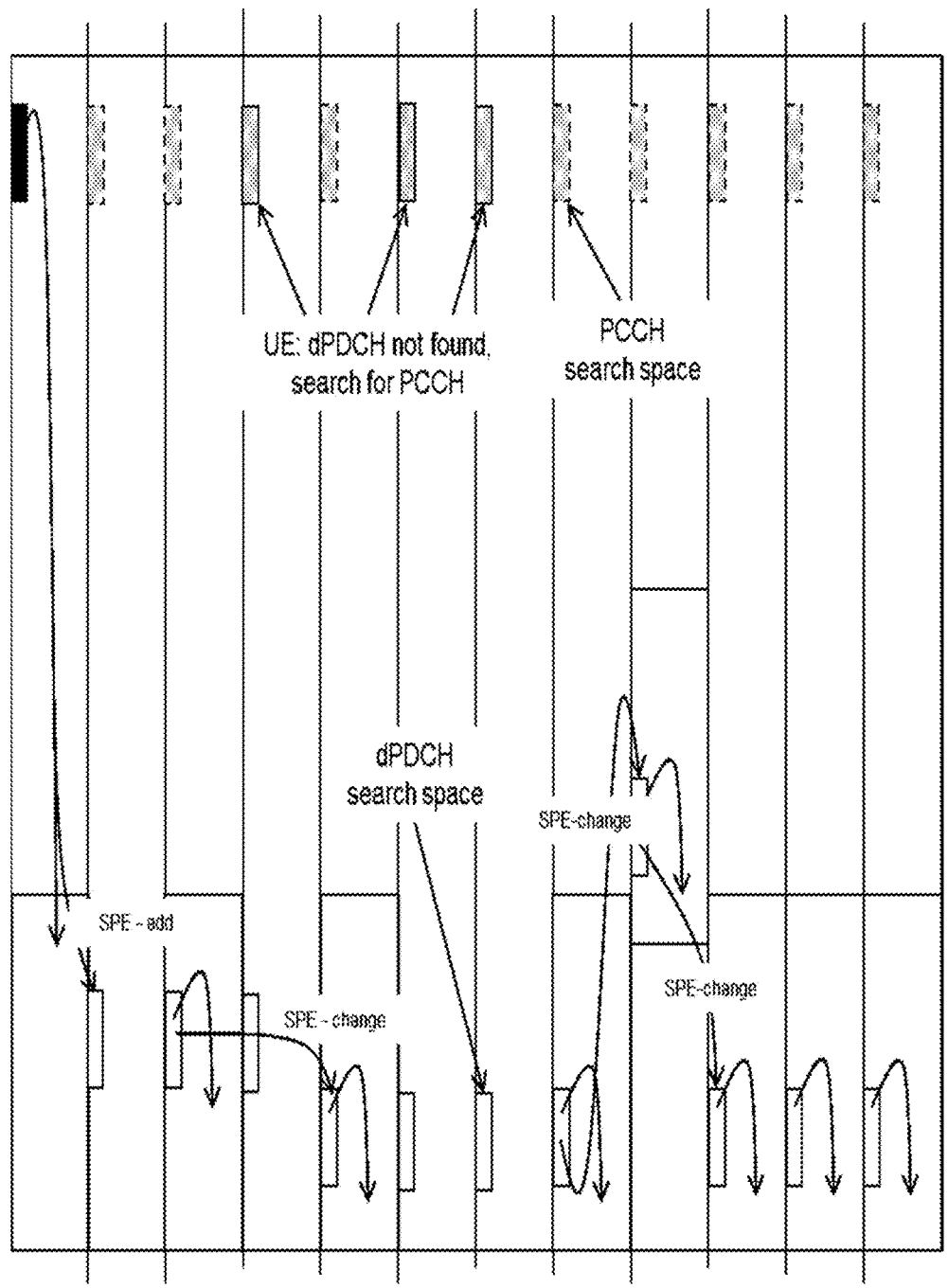
FIG. 2 is a schematic illustration of a dynamic update and change of a search space for a particular version of a physical data channel used to carry downlink assignments.

Referring to FIG. 2 the first search space may specify the location where the UE monitors a physical control channel, PCCH, and the dynamically extended search space could comprise of additional blind decoding attempts for downlink control information on radio resources inside of a dynamically scheduled physical data channel, PDCH.

The proposed technology therefore provides mechanisms whereby a search space for downlink control information (DCI) allocated to a particular wireless device may be dynamically updated by means of, for example, DCI signalling. The DCI may be transmitted directly on a downlink physical control channel, PCCH, or embedded in a MAC control element inside a scheduled downlink data channel. A Medium Access Control—control element, MAC control element, is a particular MAC structure accorded the task of carrying control information for a Long Term Evolution system where several MAC layer communication paths are possible between a wireless device and the network. More details can be found in the technical specification 3GPP TS 36.321 6.1.3 MAC Control Elements, Version 8.0.0, section 6, published 2007-12.

Wireless device search space modifications such as add/delete/move may in particular examples be signalled explicitly e.g. in a previously received DCI or MAC control element. The search space modifications may however also be implicit e.g. by automatically extending the wireless device search space to include locations used for DCI:s in the previous N TTIs or by automatically delete the oldest UE search space location when a new search space location is added. As an example, consider a scenario where a wireless device, such as a UE, initially is provided with a number of search space locations, i.e., specified downlink channels, to monitor for downlink control information. A possibility of the proposed technology is to have the earliest allocated search space location replaced with one or several new search space location(s) in order to update the search space that was initially allocated to the wireless device. The possibility to remove old and possibly obsolete search space locations and to add new and more relevant search space locations, i.e. obtain a more relevant search space, provides a mechanism whereby the search space allocated to a wireless device can be tailored to the specific wireless device and also be updated to account for changes within the network.

Figure 6A:
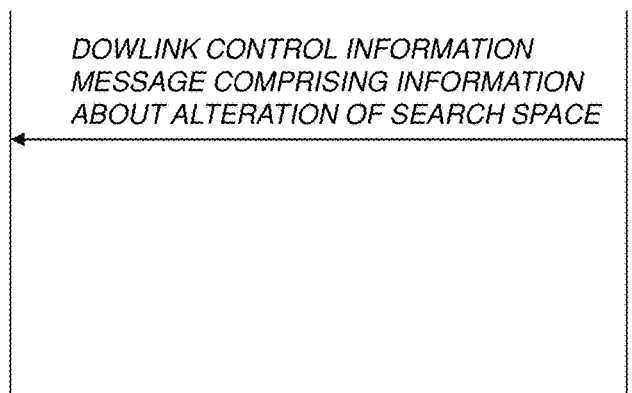
FIGS. 6A and 6B are signaling diagrams illustrating the cooperation between a wireless device and a radio network node to enable an update of a search space according to the proposed technology.

FIG. 6A provides a schematic signalling diagram that illustrates the overall signalling and cooperation between a wireless device 100 and a radio network node 200 according to the proposed technology. The radio network node 200 transmits a downlink control information message to the wireless device 100. The downlink control information comprises information relating to an alteration of the initially allocated search space for the wireless device. This information is then utilized by the wireless device to determine an updated search space.

Figure 7:
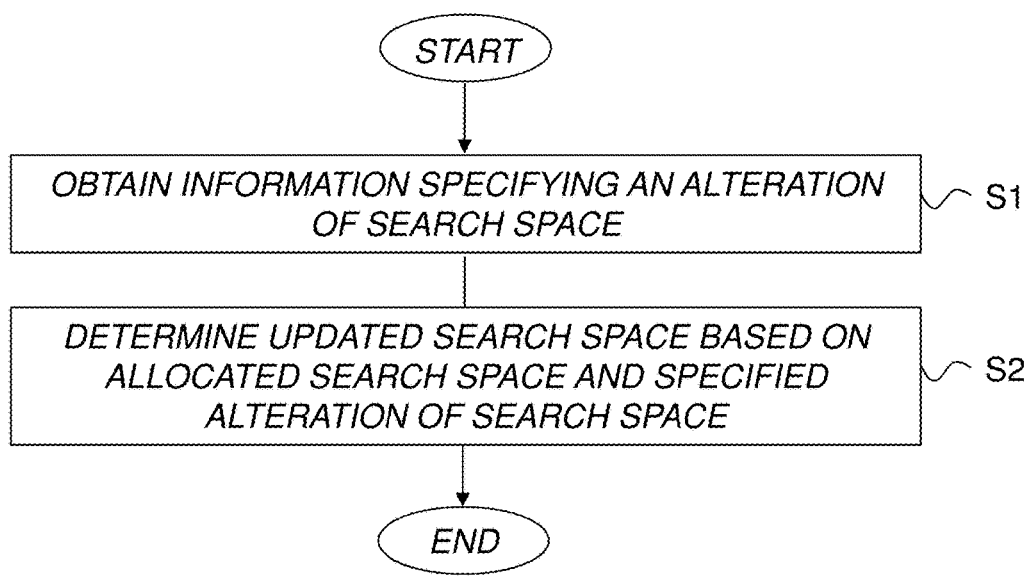
FIG. 7 is a schematic flow diagram illustrating a method for determining an updated search space according to the proposed technology.

FIG. 7 provides a schematic illustration of a method performed by a wireless device 100 for updating an allocated search space for downlink control information. The method comprises the step S1 of obtaining, from a downlink control information message, information specifying an alteration of the search space to monitor for downlink control information, DCI. The method also comprises the step S2 of determining an updated search space based on the allocated search space and the obtained information specifying an alteration of the search space.

Put in slightly different words, the proposed method is performed by a wireless device that initially or originally has been allocated or assigned a search space to monitor for downlink control information, DCI. According to the method the wireless device 100 obtains information that specifies an alteration of the initially allocated search space. The information specifying the altered search space may for example instruct the wireless device to monitor different downlink channels than the ones that are specified in the initially allocated search space. The information specifying the altered search space may add downlink channels for the wireless device to monitor or reduce the number of downlink channels that the wireless device was instructed to monitor by means of the originally allocated search space. Based on the information specifying the altered search space together with the initially allocated search space the method proceeds and constructs or determines an updated search space to monitor for downlink control information, DCI. The proposed method provides for a dynamical way to update a search space allocated to a wireless device. This will ensure that the wireless device only needs to monitor the relevant channels for downlink control information. A positive consequence of this is inter alia that the resources used by the wireless device for decoding the search space can be used more efficiently.

A particular embodiment of the proposed technology provides a method wherein the downlink control information message comprising the information is received over a downlink physical control channel.

By way of example, an embodiment of the proposed technology provides a method wherein the information specifying an alteration of the search space is obtained from downlink control information comprised in a message received over a downlink physical data channel.

A particular embodiment of the proposed technology provides a method wherein the downlink control information message is obtained by decoding a medium access control information element, MAC-element, comprised in the message received over the downlink physical data channel.

Yet another particular embodiment of the proposed technology provides a method wherein the information specifying an alteration of the search space comprises information instructing the wireless device to extend the allocated search space to also include locations used for downlink control information in earlier time transmission intervals, TTIs.

Still another particular embodiment of the proposed technology provides a method wherein the information specifying an alteration of the search space also comprises information ordering the wireless device to delete the oldest search space location from the allocated search space when the search space has been updated with added search space locations.

Figure 6B:
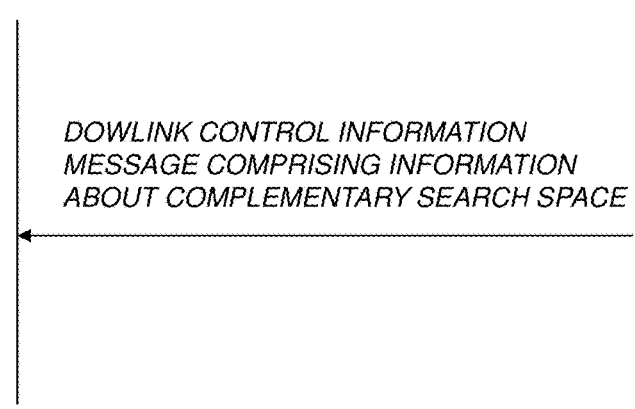

The proposed technology provides for an embodiment of the method wherein the information specifying an alteration of the search space specifies a complementary search space. A signaling diagram illustrating the overall workings is provided in FIG. 6B.

Figure 4:
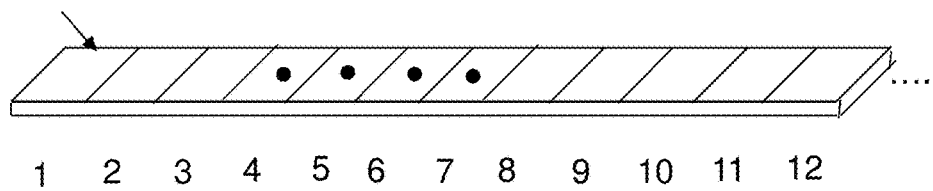
FIG. 4 is a schematic illustration of an update of a search space according to the proposed technology.
Figure 4:
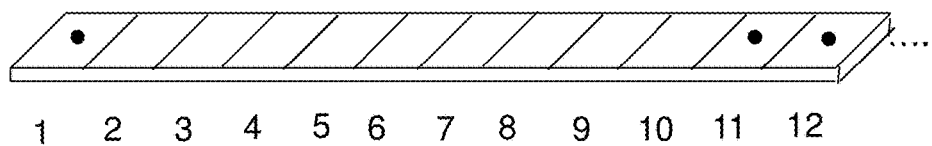
Figure 4:
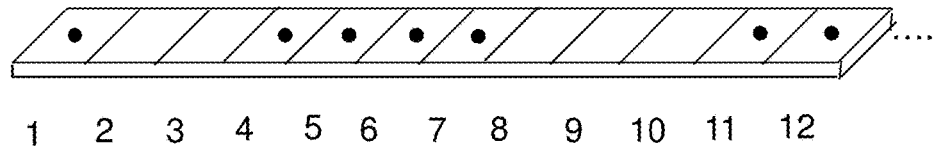

A complementary search space comprises the same type of information as the initially allocated search space. That is, it comprises one or several search space locations that specifies where a wireless device is intended to monitor for downlink control information. The complementary search space may however specify new search space locations for the wireless device to monitor and/or provide information that certain space locations within the initially allocated search space are obsolete and should be removed from the set of search space locations of the initially allocated search space. The concept of a complementary search space is illustrated schematically in FIGS. 4 and 5. In FIG. 4 the search space locations of the initially allocated search space is symbolically represented by dots specifying certain CCE indices. The allocated search space thus comprises four highlighted CCEs and the complementary search space comprises three further highlighted CCEs.

In other words, the wireless device may be provided with information that specifies further downlink channels to monitor to obtain downlink control information. The specified channels are in addition to the channels specified by the initially allocated search space. This embodiment provides an efficient way to obtain an extended search space with added search space location by adding the obtained specified channels to the initially allocated search space. An optional embodiment of the proposed technology provides an embodiment of the method where the information specifying a complementary search space also comprises instructions ordering the wireless device 100 to add the complementary search space to the allocated search space in order to extend the search space to monitor for downlink control information.

In other words, the wireless device may be provided with information that specifies further downlink channels to monitor to obtain downlink control information. The specified channels, or search space locations, are in addition to the channels specified by the initially allocated search space. This embodiment provides an efficient way to obtain an extended search space with added search space location by adding the obtained specified channels to the initially allocated search space. A simplified example is schematically illustrated in FIG. 4.

Still another optional embodiment of the proposed technology provides a method wherein the information specifying a complementary search space also comprises instructions ordering the wireless device 100 to reduce the allocated search space by removing the specified complementary search space from the allocated search space in order to obtain a reduced search space to monitor for downlink control information.

Figure 5:
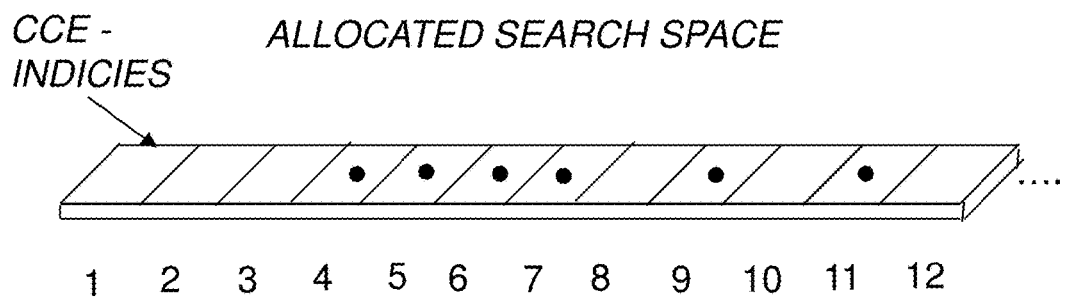
FIG. 5 is a schematic illustration of an alternative way to update a search space according to the proposed technology
Figure 5:
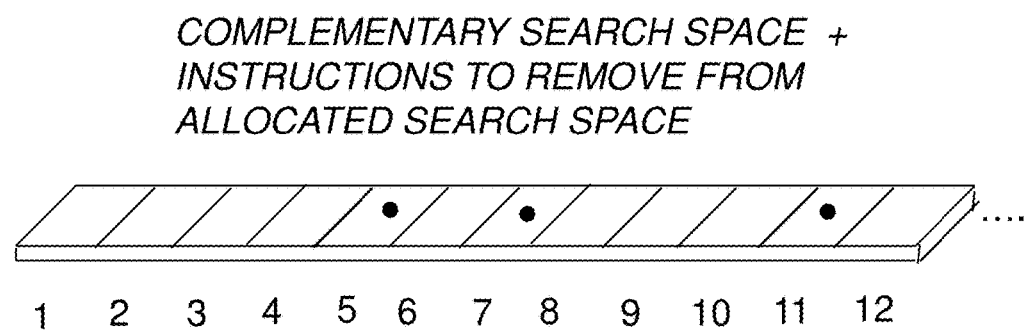
Figure 5:
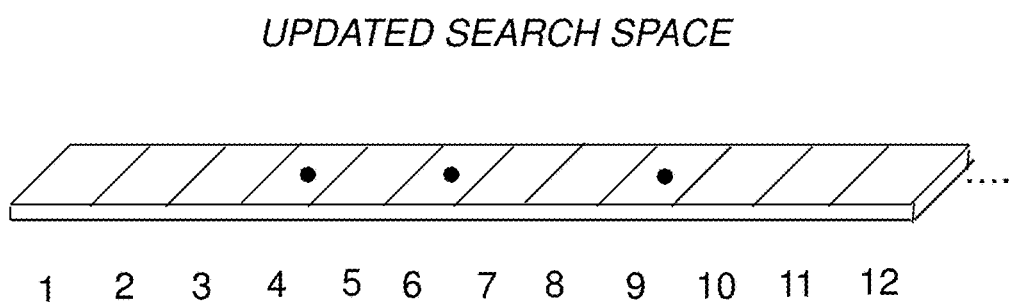

This particular embodiment provides an alternative way to obtain an altered search space. The altered search space is a reduced search space where the obtained specified downlink channels has been removed from the initially allocated search space. A simplified example is schematically illustrated in FIG. 5.

Still another exemplary embodiment of the proposed technology provides a method wherein the determined updated search space has a validity time for N future Transmission Time Intervals, where N is a standardization, system or configuration parameter.

An optional embodiment of the proposed technology provides a method wherein the allocated search space is a default search space in a downlink physical control channel, the default search space being allocated to the wireless device to monitor for downlink control information.

According to a possible embodiment of the proposed technology there is provided a method wherein the allocated search space is a search space allocated specifically to the wireless device 100.

According to yet another possible embodiment there is provided a method wherein the complementary search space is designated specifically to the wireless device 100.

Having described some specific embodiments of the proposed method below there will be provided some examples where the information specifying an alteration of the search space specifies a complementary search space. The information specifying the alteration of the search space may thus be obtained in the form of a complementary search space. The complementary search space may be more or less tailored for the wireless device and provides more details about upcoming transmissions of DCIs. The complementary search space may in a particular embodiment of the proposed method be added to the allocated search space in order to extend the search space to monitor for downlink control information.

The specifics relating to the complementary search can be obtained by means of DCI signaling from a radio network node serving the wireless device. This information may also comprise instructions to add the complementary search space to the allocated, initially assigned search space. The addition operation will render the updated search space illustrated in the lower part of the figure.

It should be noted that the complementary search space in certain embodiments also may be obtained more implicitly, i.e. without explicit signaling from a radio network node. This may in particular be controlled by specific operating regulations information wherein the wireless device is instructed to extend the allocated search space to also include locations that were successfully decoded for downlink control information in earlier time transmission intervals, TTIs. That is, if a particular location of a search space was successfully decoded during a blind decoding session of search space locations, the particular location may be added as a complementary search space to the allocated search space.

Figure 9:
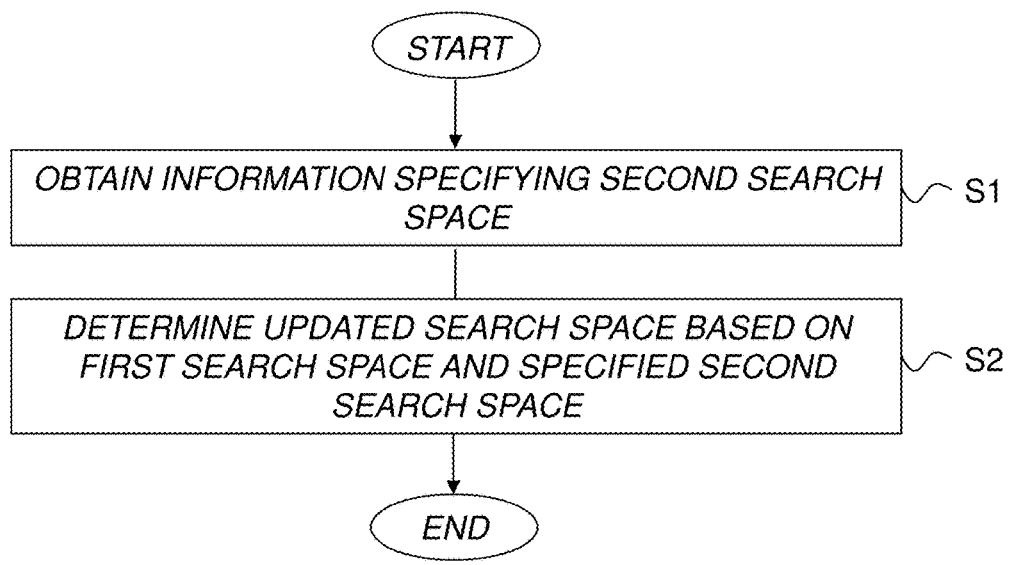
FIG. 9 is a schematic flow diagram illustrating an embodiment of the proposed technology.

A particular embodiment of the proposed technology is illustrated in the flow diagram of FIG. 9 and provides a method performed by a wireless device for updating an allocated search space for downlink control information. In FIG. 9 the complementary search space is referred to as a second search space while the original, or initial, allocated search space is referred to as the first search space. The proposed method comprises the step of obtaining information specifying a complementary search space to monitor for downlink control information, DCI. The method also comprises the step of determining an updated search space based on the allocated search space and the obtained complementary search space.

Put in slightly different words, a wireless device that is allocated or assigned a search space to monitor for DCI obtains information relating to a complementary search space. This complementary search space may be more or less tailored for the wireless device and provides more details about upcoming transmissions of DCIs. The method proceeds and constructs or determines an updated search space to monitor for DCIs based on the initially allocated search space and the obtained information about the complementary search space. More detailed embodiments will be provided below.

The described embodiment of the method provides for mechanisms that dynamically alters the search spaces that the wireless device should attempt to decode in order to obtain downlink control information, DCI for future use. The proposed method may therefore be seen as part of a method for operating a wireless device in order to blindly decode a set of resource elements on a downlink physical channel where the search space is tailored to the particular wireless device to reduce the number of attempts that the wireless device need to perform to successfully obtain downlink control information. The possibility to dynamically alter a particular wireless device search space also provide for the possibility for e.g. a radio base scheduler to provide information, in the form of a complementary search space, to a wireless device to enable the wireless device to more accurately select the resources to decode. The possibility to dynamically alter the search space may also be beneficial for certain scenarios where the signaling between a radio network node and a wireless device is performed by beam-formed transmissions. In such a scenario it may be beneficial for a radio network node to transmit downlink control information to a particular wireless device in a message over the downlink physical data channel, DL-PDCH. This may be beneficial since a beam-formed transmission from a radio network node only reaches a particular wireless device or a small number of wireless devices located within the beams reach. A possible way to communicate downlink control information to a particular wireless device may therefore be to provide the information embedded in data carrying messages transmitted over a downlink physical data channel, for example referred to as DL-PDCH. To make this work the search space of the wireless device has to be modified to also incorporate these downlink control information locations. As such the proposed method may also be seen as a method to operate a wireless device to enable beam-formed control information transmissions. Examples will be provided in the following.

According to a possible embodiment there is provided a method wherein the information specifying a complementary search space is obtained from a downlink control information message. That is, information that at least partially specifies the complementary search space may be obtained in a DCI message from a radio network node serving the wireless device.

Another possible embodiment provides a method wherein the downlink control information message comprising the indication is received over a downlink physical control channel, DL-PCCH.

Yet another possibility, as mentioned above, relates to the scenario wherein the information specifying a complementary search space is obtained from downlink control information comprised in a message received over the downlink physical data channel, DL-PDCH.

By way of example, the downlink control information message is in a particular version of the disclosed method obtained by decoding a medium access control information element, MAC-element, comprised in the message received over the DL-PDCH.

The complementary search space may in a particular embodiment of the proposed method be added to the allocated search space in order to extend the search space to monitor for downlink control information.

It should be noted that the complementary search space in certain embodiments also may be obtained implicitly, i.e. without explicit signaling from a radio network node. This may in particular be controlled by specific operating regulations information wherein the wireless device is instructed to extend the allocated search space to also include locations that were successfully decoded for downlink control information in earlier Transmission Time intervals, TTIs. That is, if a particular location of a search space was successfully decoded during a blind decoding session of search space locations, the particular location may be added as a complementary search space to the allocated search space.

According to another possible embodiment of the disclosed method, the information specifying a complementary search space may also comprise information ordering the wireless device to delete the oldest search space location from the allocated search space when the search space has been updated with added search space locations. This information may form part of the operating regulations of the wireless device but it may also be obtained by means of signaling from i.e. a radio network node serving the wireless device. A particular embodiment of the proposed method comprises the step of removing the specified complementary search space from the search space in order to obtain a reduced search space to monitor for downlink control information. This embodiment is illustrated schematically in FIG. 5.

The initially allocated search space is in this figure symbolically represented by dots specifying certain CCE indices. The allocated search space comprises five highlighted CCEs and the complementary search space comprises three highlighted CCEs. The specifics relating to the complementary search can be obtained by means of DCI signaling from a radio network node serving the wireless device. This information may also comprise instructions to remove or subtract the complementary search space to the allocated, initially assigned search space. The removal operation will render the updated search space illustrated in the lower part of the figure.

Yet another possible embodiment relates to a method wherein the allocated search space is a default search space in a downlink physical control channel, DL-PCCH, the default search space being allocated to the wireless device to monitor for downlink control information. The allocated search space is, according to a particular version of this embodiment, a search space that is allocated specifically to the wireless device.

Still another version of the embodiment provides a method wherein the complementary search space is a search space allocated specifically to the wireless device.

Having described the method performed by the wireless device to update a search space for monitoring downlink control information, in the following there will be described a complementary method performed by a radio network node to provide the wireless device with information relating to the complementary search so as to enable the wireless device to update the allocated search space.

As a background to the workings of a radio network node in this particular setting it should be noted that a scheduler in a radio network node owns and controls the radio resources in the system and makes decisions on which terminals that shall be assigned to which radio resources. The scheduler decision is based on channel state information that may be sent back from the terminals to the base stations. In addition the scheduler utilizes knowledge of the amount, priority, and requirements of the different data flows directed to and from each terminal. A scheduler may serve terminals in a round robin fashion or it may use some more advanced scheduling algorithm such as proportional fair scheduling. The scheduler optimizes multiple conflicting requirements for example, system throughput, user throughput, fairness, service guaranties, traffic priorities, inter-cell interference minimization, control and data channel utilization, etc, and decides on where each user will be scheduled. Since these variables are constantly changing the scheduler often need to change how the radio resources are utilized. Hence the radio network node, or the corresponding scheduler may make informed decisions based on at least part of described information to provide for a detailed search space to be searched by the wireless device. This detailed search space corresponds to the earlier described complementary search space.

Figure 8:
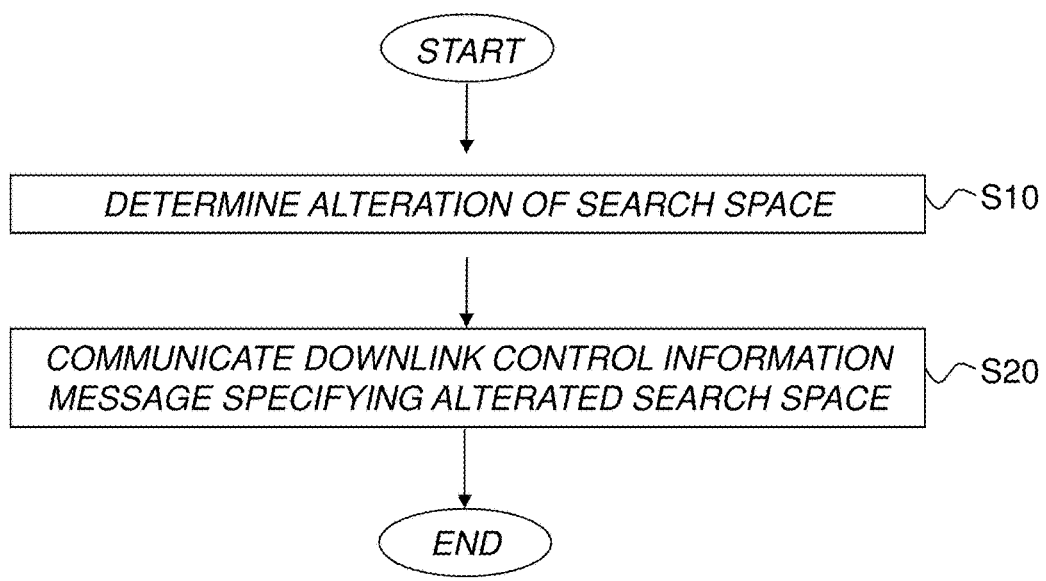
FIG. 8 is a schematic flow diagram illustrating a method according to the proposed technology.

FIG. 8 provides a schematic flow diagram illustrating a method according to the proposed technology. The flow diagram illustrates a method performed by a radio network node 200 to enable a wireless device 100 served by the radio network node 200 to perform an update of a search space allocated to the wireless device 100 to monitor for downlink control information. The method comprises the step of determining S10 an alteration of the search space allocated to the wireless device 100. The method also comprises the step of communicating S20 a downlink control information message to the wireless device 100, the downlink control information message comprising information specifying the determined alteration of the search space to enable the wireless device 100 to update its allocated search space.

A particular embodiment of the proposed technology provides a method wherein the step S10 of determining an alteration of the search space is based at least partially on information of the data flows directed to and from the wireless device 100.

As a particular example of such a data flow that, consider the case where the data flow consist of a large file download that will take some time to finalize or if the data flow is a video stream that will persist for a while then the proposed technology will be particularly beneficial since it provides a way for dynamically adjusting the UE search space which will lead to better performance and more efficient resource utilization. Information about other particular data flows, i.e., bursty data flows with sporadic and short packets may also be used when determining an alteration of the search space.

By way of the example, a possible embodiment of the proposed technology provides a method wherein the information communicated to the wireless device 100 is transmitted over a downlink physical control channel.

Another possible embodiment provides a method wherein the information is communicated to the wireless device 100 as information comprised in a message transmitted over a downlink physical data channel.

According to a particular embodiment there is provide a method wherein the information is communicated to the wireless device 100 in a medium access control element comprised in the message transmitted on the downlink physical data channel.

Another particular embodiment of the proposed technology provides a method wherein the information specifying the determined alteration of the search space specifies a complementary search space.

Still another particular embodiment of the proposed technology provides a method wherein the information specifying the complementary search space also comprises information ordering the wireless device 100 to extend its allocated search space by adding the complementary search space to its allocated search space.

Yet another particular embodiment of the proposed technology provides a method wherein the information specifying the complementary search space also comprises information ordering the wireless device 100 to reduce its allocated search space by removing the complementary search space from its allocated search space.

An optional embodiment of the proposed technology provides a method wherein the communicated downlink control information message also comprises information specifying that the updated allocated search space has a validity time for N future Transmission Time Intervals where N is a standardization, system or configuration parameter.

Having described a number of embodiments of the proposed method, below follows a number of examples where the step of determining an alteration of the search space is at least partially based on information of the data flows directed to and from the wireless device. These particular embodiments can also be used for applications where the determined alteration of the search space specifies a complementary search space.

Figure 10:
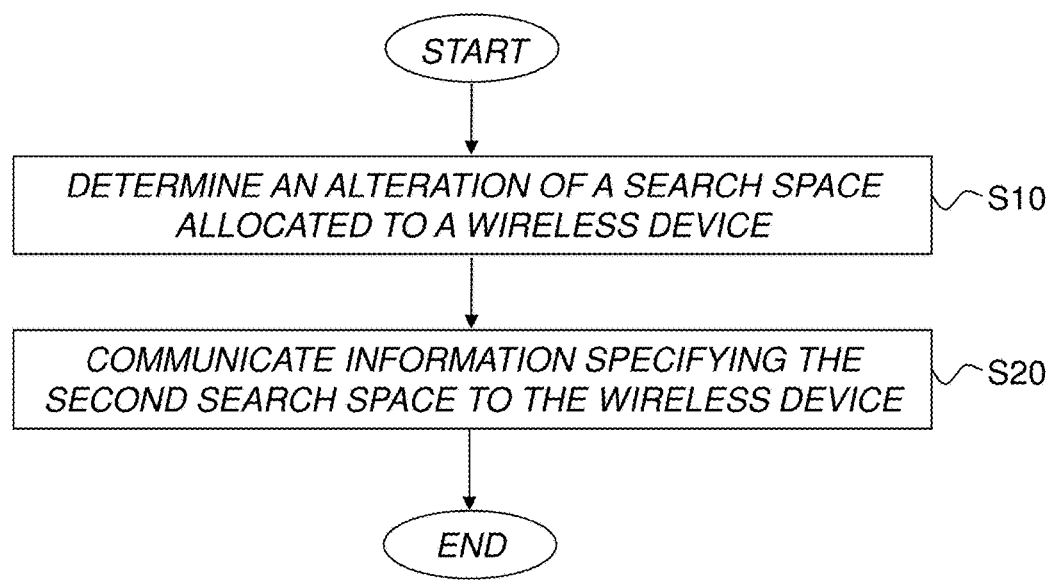
FIG. 10 is a schematic flow diagram illustrating an embodiment of the proposed technology.

FIG. 10 provides a schematic illustration of a method performed by a radio network node to enable a wireless device served by the radio network node to perform an update of a search space allocated to the wireless device to monitor for downlink control information. In FIG. 10, the altered search space is referred to as a second search space. The method comprises the step of determining, based at least partially on information of the data flows directed to and from the wireless device, an alteration of the search space allocated to the wireless device. The method also comprises the step of communicating information specifying the alteration of the search space to the wireless device to enable the wireless device to update its allocated search space.

In other words, the method provides a way for determining an alteration of the search space allocated to the wireless device and communicating the outcome to the wireless device. The determined alteration of the search space thus constitutes a change to the originally allocated search space, this change is determined in step S10 and the determined alterations, which in this particular embodiment correspond to a complementary search space, is communicated to the wireless device. The complementary search space, based on information about the altered search space, may constitute a reduced search space compared to the search space initially allocated to the wireless device. This reduced search space may, e.g. provide instructions to the wireless device to monitor fewer channels for downlink control information. The complementary search space may however also be an extended search space providing instructions to the wireless device to monitor more channels for downlink control information than allotted for by the initially allocated search space. Based on the determined alteration of the search space, by means of the complementary search space, the radio network node proceeds and communicates information relating to the complementary search space to the wireless device. When the wireless device 100 receives the information the wireless device is able to update its search space based on the initially or originally allocated search space and information about the complementary search space.

The information is, according to a particular embodiment of the proposed method, communicated to the wireless device in a downlink control information message transmitted over a downlink physical control channel, e.g. referred to as DL-PCCH.

An optional embodiment of the proposed technology provides a method, wherein the information is communicated to the wireless device as information comprised in a message transmitted over a downlink physical data channel, DL-PDCH.

An exemplary version of the proposed technology provides a method wherein the information is communicated to the wireless device embedded in a medium access control element, inside a message transmitted on the downlink physical data channel, DL-PDCH.

Yet another exemplary version of the proposed technology provides a method wherein the information comprises information about at least one additional search space and information ordering the wireless device to extend its allocated search space by adding the at least one additional search space to its allocated search space.

According to an alternative version of the disclosed method, the information comprises information about at least one additional search space and information ordering the wireless device to reduce its allocated search space by removing the at least one additional search space from its allocated search space.

Having described a number of possible embodiments relating to the proposed methods in the following sections a number of examples will be provided. The examples are merely intended to facilitate the understanding of the overall concept and should not be viewed as limiting.

Figure 1B:
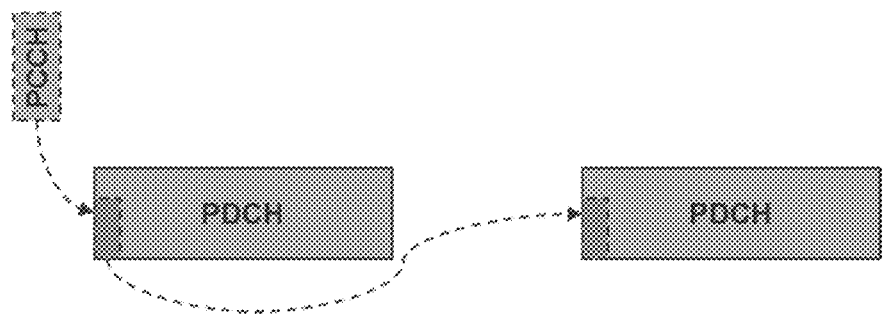
FIG. 1b is a schematic illustration of an example of a "daisy chain" of downlink control information, DCI. When the UE is scheduled for a DL data transmission a part of the in-band radio resources may be used for downlink control information. The downlink control information field, denoted as a dashed field in the figure, may contain information that enables the UE to search for future downlink control information.

In some scenarios it would be desirable to send the next grant inside a granted physical data channel transmission, PDCH transmission. This would offload the physical control channel, PCCH, due to that only the first PCCH transmission would occur during the session. Such an embodiment where only a first grant is transmitted on the PCCH while following grants are transmitted inside an already granted PDCH is referred to as a daisy chain scheme. Such a daisy chain scheme is illustrated in FIG. 1B and this particular scheme leads to a significant offload of the PCCH. As a result dimensioning of PCCH could be reduced and more resources could be allocated to PDCH which in turn results in increased throughput. The daisy chain scheme suffers from error propagation. In more detail FIG. 1B illustrates an example of a "daisy chain" of downlink control information, DCI. When the wireless device/UE is scheduled for a DL data transmission a part of the in-band radio resources may be used for downlink control information. The downlink control information field, denoted as a dashed field in the figure, may contain information that enables the UE to search for future downlink control information.

Another problem today is that standardized control channels, e.g. PDCCH/ePDCCH in LTE, are designed as a one fit all solution, for example, with a particular false-detection probability. Hence all services that cannot live with this false-detection rate are problematic, for example, Critical-MTC services. The same problem is for low requirement services like Massive-MTC that would like less strict requirements, for example, in relation to timing.

As a particular example of a situation where the proposed technology can be used, reference is made to FIG. 2. FIG. 2 illustrates 10 TTIs, Transmission Time Intervals, for a scenario wherein a PCCH, Physical Control Channel, is used as bootstrap channel used for the initial transmission to a wireless device such as an UE, User Equipment. In FIG. 2 the abbreviation SPE refers to a Search sPace Extension. The term, SPE-add, refers to a dynamic addition of a UE search space location, while SPE-change refers to a dynamic modification of the UE search space. The term dPDCH refers to a direct physical data channel, i.e. a part of the scheduled resource used for directly decodable information, i.e. direct in the sense that the dPDCH does not support soft-combining of multiple transmission attempts, such as downlink control information, DCI.

In the first grant, in the first TTI in FIG. 2, sent on PCCH there is an assignment on a PDCH, Physical Data Channel. Additionally to the PDCH assignment there is an indication indicating a search space extension, such as for example a search space addition, instructing the UE to also monitor an additional search space wherein the UE shall be prepared to receive assignments of a PDCH. The UE attempts to decode the additional search space:

If the decoding fails, the UE assumes that nothing was assigned in this search. For error recovery purpose it is preferable that UE also monitor the search space(s) on the physical control channel, PCCH.

If the decoding succeeds, the UE process the grant which may involve decoding an assigned downlink transmission; and/or transmit in uplink according to the grant; and/or adjust the search space in accordance with the received downlink control information, DCI.

In some embodiments the indication indicates a change for additional search space wherein the UE changes the location where it monitors the additional search space. The additional search space may be one or more additional search spaces. In some embodiments the UE may receive a search space delete indication for one currently active search spaces. In further other embodiments the search space extension has a validity time, for example, being valid for N future TTI wherein N is a standardization, system or configuration parameter. The validity time could also be explicitly indicated in the indication.

Figure 3A:
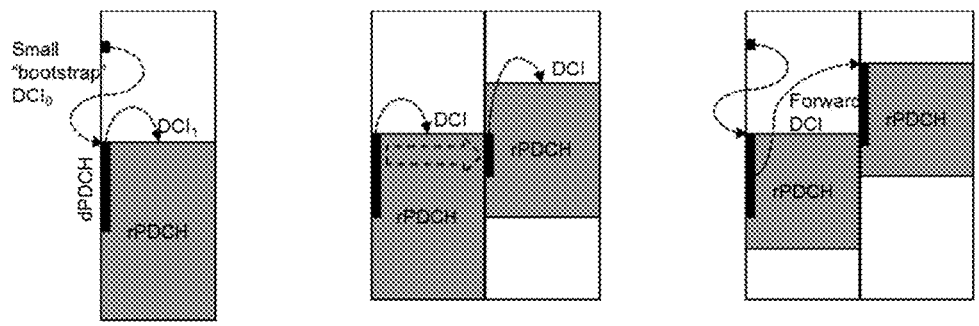
FIG. 3a is a schematic illustration of a dynamic update of a search space according to the proposed technology.

In the left part of FIG. 3a there is shown an example in which the default UE search space consists of at least one downlink physical control channel, DL-PCCH. This channel, or these channels, needs to be robust and should preferably be able to reach all UEs without any additional closed-loop antenna beamforming gain. Therefore the capacity of this channel should be limited and the primary usage is to boot-strap a transmission towards a UE that does not have any current scheduled resources. The message on this channel could e.g. be to indicate a dynamic search space extension valid for the same TTI of a directly decodable part of the downlink physical data channel, dPDCH. The term dPDCH in the figure denotes a direct channel and might be referred to as a direct Physical Data Channel, i.e. a part of the scheduled radio resource used for directly decodable information such as downlink control information, DCI. The dPDCH is direct in the sense that the dPDCH does not support soft-combining of multiple transmission attempts. A second channel, rPDCH, which can be referred to as a "re-transmittable" or "retaining" channel, carries re-transmittable data, i.e., data that will be retransmitted in the event that a negative acknowledgement is received by the transmitting node (or, in some cases, in the event that an acknowledgement is not received), and for which decoding-related information can be retained by the receiving node in the event of an unsuccessful decoding of the data, for use in combining with decoding-related information obtained when decoding the corresponding retransmitted data. This re-transmittable channel might be referred to as a re-transmittable Physical Downlink Channel, or rPDCH, for example. The direct and re-transmittable channels can each carry both control and user data information.

The left part of FIG. 3a illustrates a UE search space that consists of at least a downlink physical control channel, DL-PCCH, downlink control channel default search space. The middle part of FIG. 3a illustrate that the UE search space may be implicitly extended by previously scheduled transmissions. The right part of FIG. 3a illustrates that a DCI may contain a UE search space extension that will be valid for a future transmission. The middle part of FIG. 3a illustrates that the search for DCI messages on the dPDCH may start in places where dPDCH content has previously been allocated. Note that the size of the dPDCH may be different since if the potential search start location is given then the UE may still be able to perform a few blind decoding attempts for the actual size and presence of the dPDCH. Also note that although the direct part of the DPCH does not change start position in this example the re-transmittable part of the PDCH may do so. This implies that a UE may be given another resource assignment for the data transmission part of the TTI while keeping the same start location for the directly decodable control information part of the TTI. One implicit rule may be that during N TTIs the UE shall search in old dPDCH start locations. This reduces the problems with error propagation that the daisy chain control scheme suffers from. In the rightmost part of FIG. 3a it is shown an example of a dynamic update of the dPDCH search space. Both the PCCH and the dPDCH can be used to dynamically "move" the search space for current and/or future dPDCH transmissions. On the dPDCH the search space modifications may be in the form of a forward pointing DCI messages or, in case the dPCHD carries a normal L2 transport block the search space modification may be communicated in the form of a MAC control element.

Figure 3B:
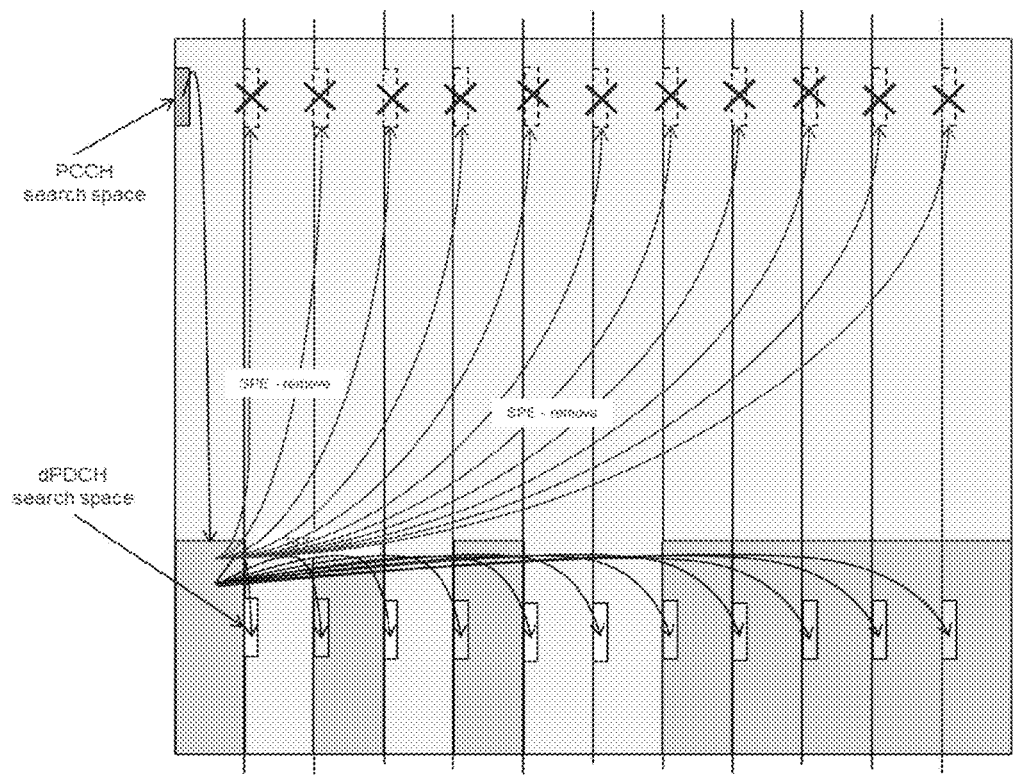
FIG. 3b is a schematic illustration of an alternative dynamic update of a search space according to the proposed technology. It illustrates a dynamic search space restriction to avoid false detections.

A particular embodiment of the proposed method relates to dynamic search space restrictions. According to this embodiment a wireless device is, after initial scheduling on PCCH, restricted from listening to PCCH as the false detection rate on PCCH can be too high to support the service, e.g. if the UE is a Critical MTC device. Hence by removing PCCH from the search space the detection error events due to false detection can be avoided. One example of a bad false detection event in TDD is if an UE detects an UL-grant as this will lead to that the UE transmits in UL and can thus miss a dPDCH transmission and hence the Critical service fails. In practice some Critical MTC services are never allowed to fail when they have a 1e-9 error requirement, compare as a reference that a 16 bit CRC, as in LTE PDCCH, gives a "noise" false detection of 1.5e-5. This is illustrated in FIG. 3b. To clarify, the error detection capability of a CRC code of length n is $2^{(-n)}$. A 16 bit CRC can detect a random bit error with probability $2^{(-16)}=1.5\times10^{(-5)}$. Since this is much larger than $10^{(-9)}$ a 16 bit CRC is not sufficient for critical (high reliability) MTC applications. A UE may therefore erroneously think it was scheduled with a probability $1.5\times10^{(-5)}$ if 16 bit CRC is used on the control channel messages. The term, SPE-remove, in the figure refers to a dynamic removal of UE search space location. Having described various embodiments and particular examples of methods according to the proposed technology, in the following corresponding devices will be described. The devices are in general configured to perform the described methods and all advantages associated with the methods are also relevant for the corresponding devices.

According to the proposed technology there is provided a wireless device 100 that is configured to update an allocated search space for downlink control information.

Figure 11A:
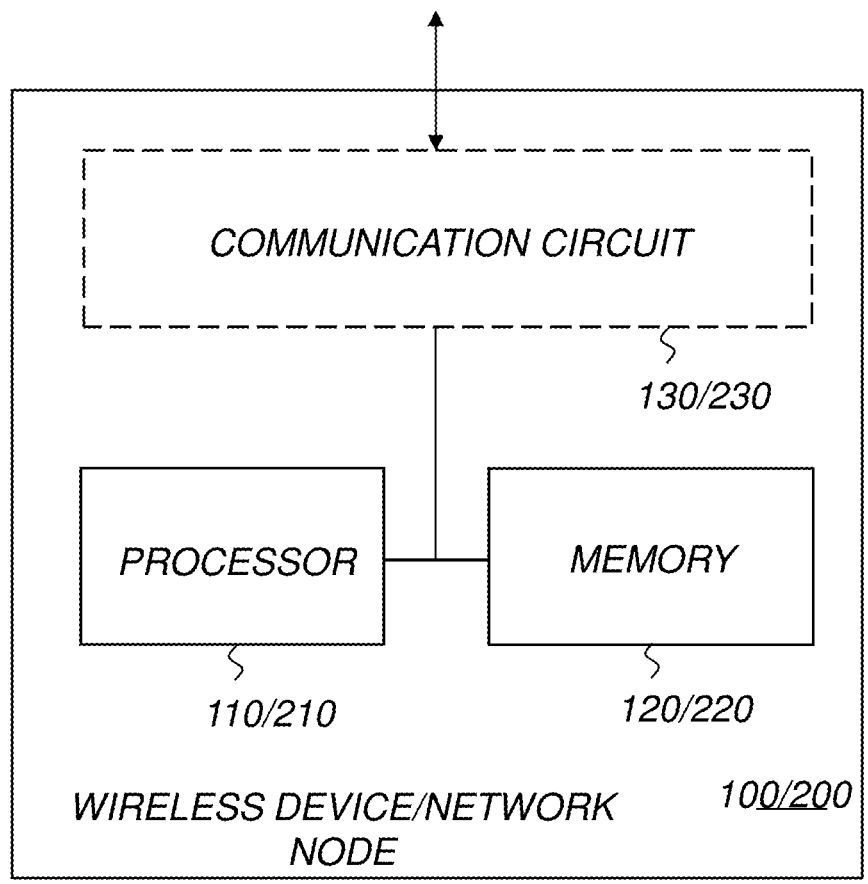
FIGS. 11A and 11B are schematic block diagrams illustrating a wireless device and a radio network node according to the proposed technology.

FIG. 11A provides a block diagram illustrating a wireless device 100 configured to update an allocated search space for downlink control information. The wireless device 100 is configured to obtain, from a downlink control information message, information specifying an alteration of the search space to monitor for downlink control information, DCI. The wireless device 100 is also configured to determine an updated search space based on the allocated search space and the obtained information specifying an alteration of the search space. A possible embodiment of the proposed technology provides a wireless device 100 that is configured to obtain the downlink control information message comprising the indication by receiving it over a downlink physical control channel.

Another possible embodiment provides a wireless device 100 that is configured to obtain the information specifying an alteration of the search space from downlink control information comprised in a message received over the downlink physical data channel.

A particular version of the embodiment where the message is received over the downlink physical data channel provides a wireless device 100 that is configured to obtain the downlink control information message by decoding a medium access control information element, MAC-element, comprised in the message received over the downlink physical data channel.

Another particular embodiment provides a wireless device 100 wherein the wireless device 100 is configured to extend the search space by also including search space locations used for downlink control information in earlier Transmission Time intervals, TTIs.

Still another particular embodiment provides a wireless device 100 wherein the wireless device 100 is configured to delete the oldest search space location from the allocated search space when the allocated search space has been updated. That is when the allocated search space has been provided with additional search space locations.

The wireless device 100 may according to a particular embodiment be configured to delete the oldest search space location from the allocated search space when the search space has been updated.

A particularly useful embodiment of the wireless device 100 according to the proposed technology relates to a wireless device 100 wherein the information specifying an alteration of the search space specifies a complementary search space.

The wireless device 100 may according to the above mentioned embodiment be a wireless device 100 that is configured to add the complementary search space to the allocated search space in order to extend the search space to monitor for downlink control information.

The wireless device 100 could, according to an alternative version of the embodiment where the search space specifies a complementary search space, be a wireless device 100 that is configured to remove the specified complementary search space from the allocated search space in order to obtain a reduced search space to monitor for downlink control information.

Another possible embodiment of the proposed technology provides a wireless device 100 wherein the determined updated search space has a validity time for N future Transmission Time Intervals, where N is a standardization, system or configuration parameter.

By way of example, the proposed technology provides a wireless device 100 wherein the allocated search space is a default search space in a downlink physical control channel, the default search space being allocated to the wireless device to monitor for downlink control information.

An optional embodiment of the proposed technology provides a wireless device 100 wherein the allocated search space is a search space allocated specifically to the wireless device 100.

It will be appreciated that the methods and devices described herein can be combined and re-arranged in a variety of ways. For example, embodiments may be implemented in hardware, or in software for execution by suitable processing circuitry, or a combination thereof.

FIG. 11A illustrates a particular version of a wireless device 100 according to the proposed technology. The wireless device 100 comprises a processor 110 and a memory 120, the memory comprising instructions executable by the processor, whereby the processor is operative to update an allocated search space for downlink control information.

Figure 12A:
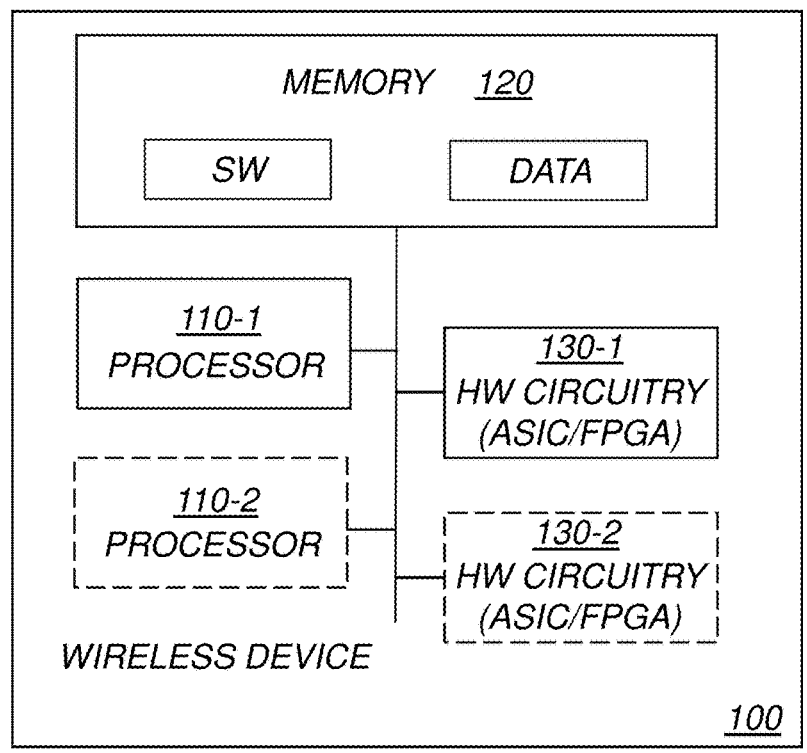
FIGS. 12A and 12B are schematic block diagrams illustrating a wireless device and a radio network node, respectively, according to the proposed technology.

FIG. 12A is a schematic block diagram illustrating yet another example of an wireless device 100, based on combination of both processor(s) 110-1, 110-2 and hardware circuitry 130-1, 130-2 in connection with suitable memory unit(s) 120. The wireless device 100 comprises one or more processors 110-1, 110-2, memory 120 including storage for software and data, and one or more units of hardware circuitry 130-1, 130-2 such as ASICs and/or FPGAs. The overall functionality is thus partitioned between programmed software, SW, for execution on one or more processors 110-1, 110-2, and one or more pre-configured or possibly reconfigurable hardware circuits 130-1, 130-2 such as ASICs and/or FPGAs. The actual hardware-software partitioning can be decided by a system designer based on a number of factors including processing speed, cost of implementation and other requirements.

The wireless device 100 may also include communication circuitry 130. The communication circuitry may include functions for wired and/or wireless communication with other devices and/or network nodes in the network. In a particular example, the wireless device may include radio circuitry for communication with one or more other nodes, including transmitting and/or receiving information. The communication circuitry may be interconnected to the processor and/or memory.

The proposed technology thus provides a wireless device that also comprises a communication circuit 130. FIG. 11A is a schematic block diagram illustrating an example of a wireless device 100 comprising a processor 110, an associated memory 120 and a communication circuitry 130. The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 11B:
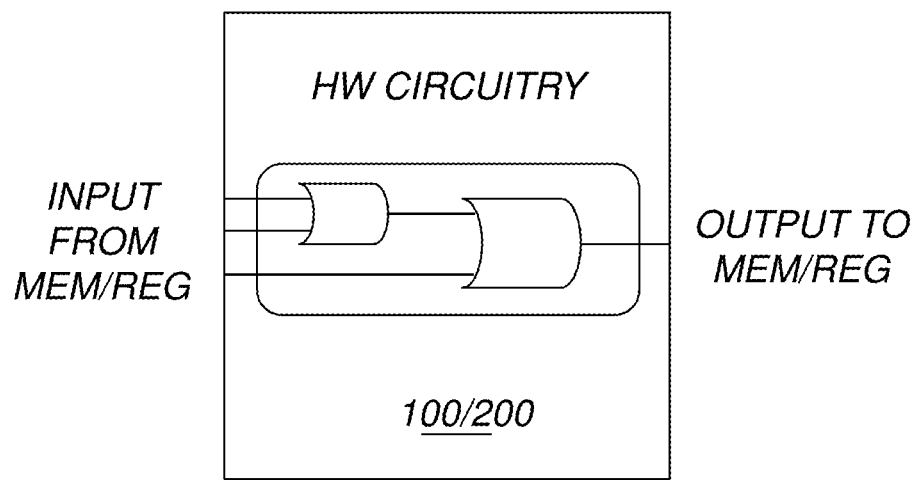

FIG. 11B is a schematic block diagram illustrating possible hardware circuitry for an exemplary wireless device 100. It is illustrated how a hardware circuitry takes input from a memory/register, MEM/REG, and provides an output to MEM/REG.

The proposed technology disclosed herein may be applied to a user terminal, which may be a wired or wireless device. As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

Having described a number of embodiments of a wireless device 100 according to the proposed technology, below there is given a number of exemplary embodiments where the information specifying an alteration of the search space specifies a complementary search space. A complementary search space has been described earlier with reference to FIG. 4.

FIG. 11A provides a schematic illustration of a wireless device that is configured to obtain information specifying a complementary search space to monitor for downlink control information, DCI. The illustrated wireless device is also configured to determine an updated search space based on the assigned search space and the obtained complementary search space.

A possible embodiment of the proposed wireless device 100 comprises a wireless device that is configured to obtain information specifying a complementary search space from a downlink control information message.

Another possible embodiment provides a wireless device 100 that is configured to obtain the downlink control information message comprising the indication by receiving it over a downlink physical control channel, DL-PCCH.

Still another possible embodiment provides a wireless device 100 that is configured to obtain the information specifying a complementary search space from downlink control information comprised in a message received over a downlink physical data channel, DL-PDCH.

Yet another possible embodiment provides a wireless device 100 that is configured to obtain the downlink control information message by decoding a medium access control information element, MAC-element, comprised in the message received over the DL-PDCH.

By way of example, the proposed technology provides an embodiment of a wireless device 100 that is configured to add the specified complementary search space to the search space in order to extend the search space to monitor for downlink control information.

A version of a wireless device 100 according to the proposed technology provides a wireless device 100 that is configured to extend the search space by also including search space locations used for downlink control information in earlier time transmission intervals, TTIs.

An embodiment of a wireless device 100 according to the proposed technology provides a wireless device 100 that is configured to delete the oldest search space location from the allocated search space when the search space has been updated with added search space locations.

An embodiment of a wireless device 100 according to the proposed technology provides a wireless device 100 that is configured to remove the specified complementary search space from the search space in order to obtain a reduced search space to monitor for downlink control information.

Yet another embodiment of a wireless device 100 is related to a wireless device wherein the search space is a default search space in a downlink physical control channel, DL-PCCH, the default search space being allocated to the wireless device to monitor for downlink control information.

According to another aspect there is also disclosed a radio network node 200 configured to perform the method to enable a wireless device served by the radio network node to perform an update of a search space allocated to the wireless device to monitor for downlink control information.

FIG. 11A provides a schematic illustration of such a radio network. FIG. 11A illustrates a radio network node 200 configured to enable a wireless device 100 served by the radio network node to perform an update of a search space allocated to the wireless device 100 to monitor for downlink control information. The radio network node 200 is configured to determine an alteration of the search space allocated to the wireless device 100.

The radio network node 200 is also configured to communicate a downlink control information message to the wireless device 100, the downlink control information message comprising information specifying the alteration of the search space to enable the wireless device 100 to update its allocated search space.

A particular embodiment of the proposed technology provides a radio network node 200 wherein the radio network node 200 is configured to determine the alteration of the search space based at least partially on information of the data flows directed to and from the wireless device 100.

Another possible embodiment provides a radio network node 200 that is configured to communicate the information to the wireless device 100 in a downlink control information message transmitted over a downlink physical control channel.

By way of example, the proposed technology provides a radio network node 200 wherein the radio network node 200 is configured to communicate the information to the wireless device 100 as information comprised in a message transmitted over a downlink physical data channel.

A particular embodiment of the proposed technology provides a radio network node 200 that is configured to communicate the information to the wireless device 100 embedded in a medium access control element comprised in a message transmitted on the downlink physical data channel.

Still another embodiment of the proposed technology provides a radio network node 200 wherein the information specifying an alteration of the search space specifies a complementary search space.

According to a particular version of the above mentioned embodiment there is provided a radio network node 200 that is configured to communicate information specifying a complementary search space and information ordering the wireless device 100 to extend its allocated search space by adding the complementary search space to its allocated search space.

According to an alternative version of the embodiment where the information specifying an alteration of the search space specifies a complementary search space, there is provided radio network node 200 that is configured to communicate information specifying the complementary search space and information ordering the wireless device 100 to reduce its allocated search space by removing the complementary search space from its allocated search space.

An optional but useful embodiment of the proposed technology provides a radio network node 200 that is configured to communicate a downlink control information message that also comprises information specifying that the updated search space has a validity time for N future Transmission Time Intervals, where N is a standardization, system or configuration parameter. A particular embodiment of the proposed technology provides a radio network node 200 wherein the radio network node 200 comprises a processor 210 and a memory 220, the memory comprising instructions executable by the processor, whereby the processor is operative to enable an update of an allocated search space for downlink control information. Such an embodiment is illustrated in FIG. 11A.

Another embodiment provides a radio network node 200 wherein the radio network node 200 also comprises a communication circuit 230.

FIG. 11B is a schematic block diagram illustrating possible hardware circuitry for an exemplary radio network node 100. It is illustrated how a hardware circuitry takes input from a memory/register, MEM/REG, and provides an output to MEM/REG.

It will be appreciated that the methods and devices described herein can be combined and re-arranged in a variety of ways. For example, embodiments may be implemented in hardware, or in software for execution by suitable processing circuitry, or a combination thereof.

A particular embodiment of the radio network node is illustrated in FIG. 11A. The illustrated radio network node 200 comprises a processor 210 and a memory 220, the memory comprising instructions executable by the processor, whereby the processor is operative to update an allocated search space for downlink control information.

Optionally, the radio network node may also include communication circuitry 230. FIG. 11A also provides a schematic block diagram illustrating an example of a radio network node 200 comprising a processor 210, an associated memory 220 and a communication circuitry 230. The communication circuitry 230 may include functions for wired and/or wireless communication with other devices and/or network nodes in the network. In a particular example, radio network node may include radio circuitry for communication with one or more other nodes, including transmitting and/or receiving information. The communication circuitry may be interconnected to the processor and/or memory.

Figure 12B:
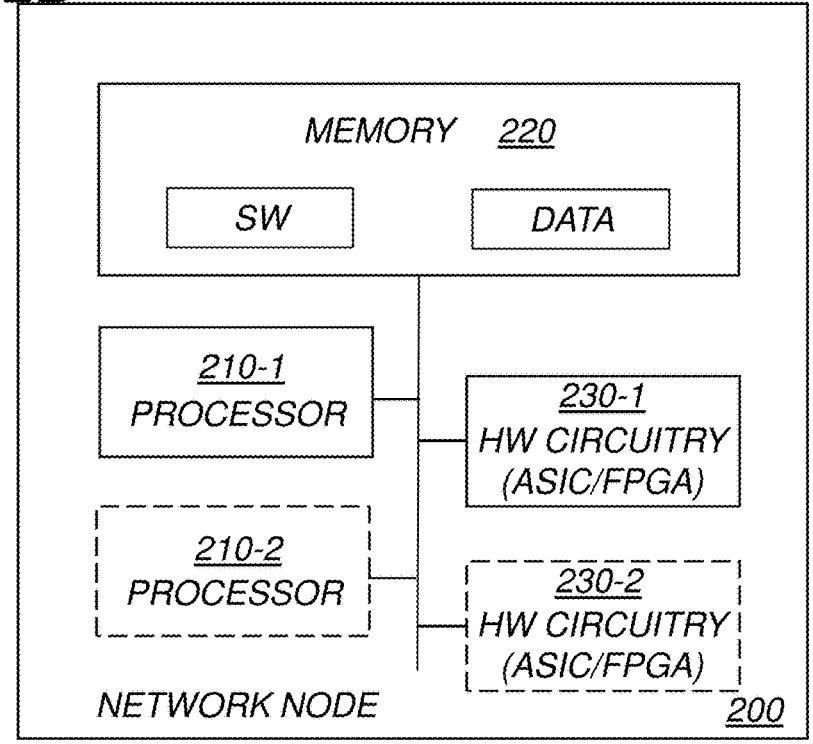

FIG. 12B is a schematic block diagram illustrating yet another example of a radio network node 200, based on combination of both processor(s) 210-1, 210-2 and hardware circuitry 230-1, 230-2 in connection with suitable memory unit(s) 220. The radio network node 200 comprises one or more processors 210-1, 110-2, memory 220 including storage for software and data, and one or more units of hardware circuitry 230-1, 230-2 such as ASICs and/or FPGAs. The overall functionality is thus partitioned between programmed software, SW, for execution on one or more processors 210-1, 210-2, and one or more pre-configured or possibly reconfigurable hardware circuits 230-1, 230-2 such as ASICs and/or FPGAs. The actual hardware-software partitioning can be decided by a system designer based on a number of factors including processing speed, cost of implementation and other requirements.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Having described a number of embodiments of the proposed radio network node, below will follow a number of possible embodiments for a radio network node where the alteration of the search space is determined based at least partially on the data flow to and from the wireless device 100.

A particular example of the proposed technology therefore provides a radio network node 200 configured to enable a wireless device 100 served by the radio network node 200 to perform an update of a search space allocated to the wireless device 100 to monitor for downlink control information. The radio network node 200 is configured to determine, based at least partially on information of the data flows directed to and from the wireless device 100, an alteration of the search space allocated to the wireless device 100.

The radio network node 200 is also configured to communicate information specifying the alteration of the search space to the wireless device 100 to enable the wireless device 100 to update its allocated search space.

A possible embodiment of the proposed technology provides a radio network node 200 that is configured to communicate the information to the wireless device 100 in a downlink control information message transmitted over a downlink physical control channel, DL-PCCH.

An exemplary embodiment of the radio network node 200 is configured to communicate the information to the wireless device 100 as information comprised in a message transmitted over a downlink physical data channel, DL-PDCH.

Still another embodiment of the proposed technology provides a radio network node 200 that is configured to communicate the information to the wireless device 100 embedded in a medium access control element, inside a message transmitted on the downlink physical data channel, DL-PDCH.

By way of example, the disclosed technology discloses a radio network node 200 that is configured to communicate information about at least one additional search space and information ordering the wireless device 100 to extend its allocated search space by adding the at least one additional search space to its allocated search space.

An embodiment of the disclosed technology provides a radio network node 200 that is configured to communicate information about at least one additional search space and information ordering the wireless device 100 to reduce its allocated search space by removing the at least one additional search space from its allocated search space.

It will be appreciated that the methods and devices described herein can be combined and re-arranged in a variety of ways. For example, embodiments may be implemented in hardware, or in software for execution by suitable processing circuitry, or a combination thereof.

A particular embodiment of the radio network node is illustrated in FIG. 11A. The illustrated radio network node 200 comprises a processor 210 and a memory 220, the memory comprising instructions executable by the processor, whereby the processor is operative to update an allocated search space for downlink control information.

FIG. 12B is a schematic block diagram illustrating yet another example of a radio network node 200, based on combination of both processor(s) 210-1, 210-2 and hardware circuitry 230-1, 230-2 in connection with suitable memory unit(s) 220. The radio network node 200 comprises one or more processors 210-1, 110-2, memory 220 including storage for software and data, and one or more units of hardware circuitry 230-1, 230-2 such as ASICs and/or FPGAs. The overall functionality is thus partitioned between programmed software, SW, for execution on one or more processors 210-1, 210-2, and one or more pre-configured or possibly reconfigurable hardware circuits 230-1, 230-2 such as ASICs and/or FPGAs. The actual hardware-software partitioning can be decided by a system designer based on a number of factors including processing speed, cost of implementation and other requirements.

Optionally, the radio network node may also include communication circuitry 230. The communication circuitry may include functions for wired and/or wireless communication with other devices and/or network nodes in the network. In a particular example, radio network node may include radio circuitry for communication with one or more other nodes, including transmitting and/or receiving information. The communication circuitry may be interconnected to the processor and/or memory.

FIG. 11A provides a schematic block diagram illustrating an example of a radio network node 200 comprising a processor 210, an associated memory 220 and a communication circuitry 230.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 11B is a schematic block diagram illustrating possible hardware circuitry for an exemplary radio network node 200. It is illustrated how a hardware circuitry takes input from a memory/register, MEM/REG, and provides an output to MEM/REG.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

In the particular examples with a processor and memory implementation of the disclosed wireless device and radio network node, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The disclosed technology also provides for a computer program 131, 135 for performing, when executed by at least one processor, an update of an allocated search space for downlink control information, the computer program comprises instructions, which when executed, cause the at least one processor to:
  read information relating to a specified alteration of the search space in a downlink physical control channel to monitor for downlink control information, DCI;
  determine, based on the read information, an updated search space based on the allocated search space and the specified alteration of the search space.

Figure 13:
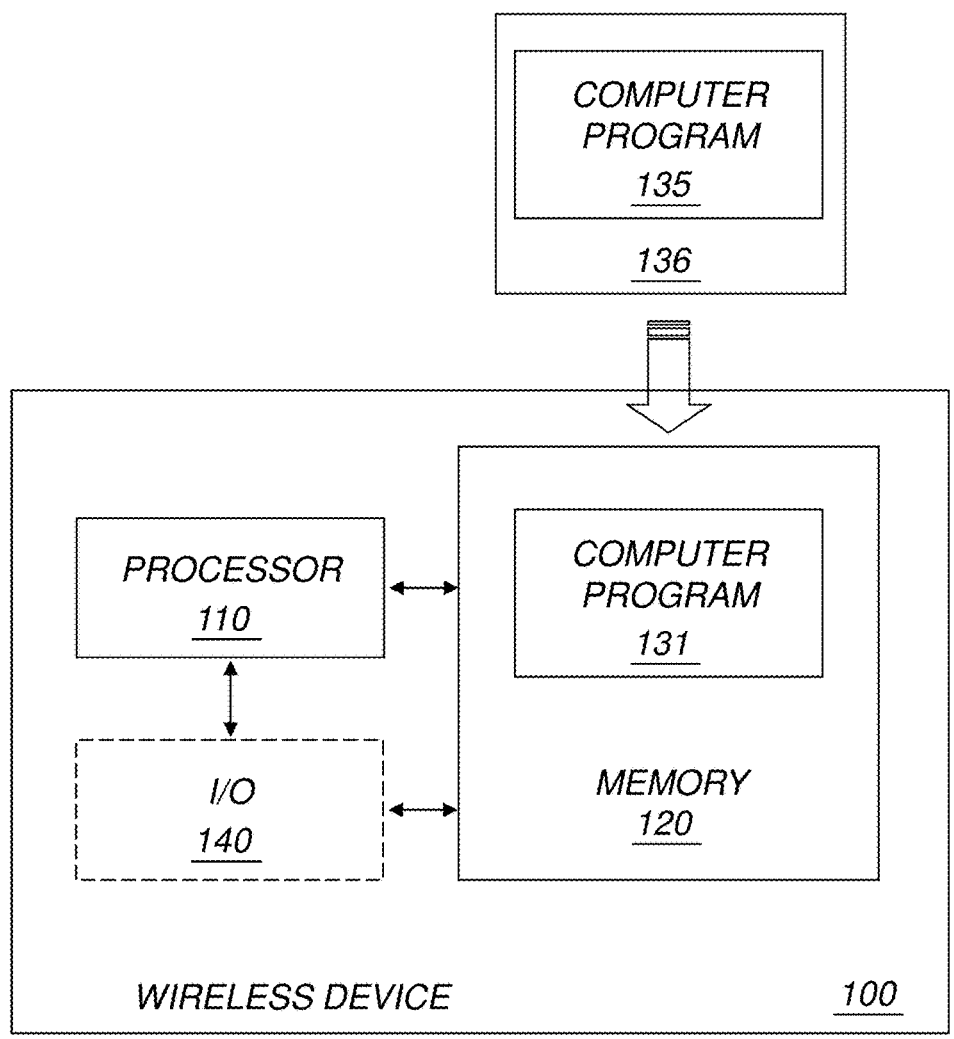
FIG. 13 is a schematic block diagram illustrating a wireless device use of a computer program according to the proposed technology.

FIG. 13 illustrates an embodiment wherein a computer program 131 or 135 is executed to perform update of an allocated search space for downlink control information.

A particular example of a computer program for the application where the information relating to a specified alteration of the search space comprises a complementary search space is provided by a computer program 131,135 for performing, when executed by at least one processor, an update of an allocated search space for downlink control information, the computer program comprises instructions, which when executed, cause the at least one processor to:
  read information relating to a specified complementary search space in a downlink physical control channel to monitor for downlink control information, DCI;
  determine, based on the read information, an updated search space based on the allocated search space and the obtained complementary search space.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 131, 135 may be realized as a computer program product 136, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology further provides a computer program 231, 235 for performing, when executed by at least one processor, an update of a search space for downlink control information allocated to a wireless device 100, the computer program comprises instructions, which when executed, cause the at least one processor to:
  determine an alteration of the search space allocated to the wireless device 100
  output information specifying the alteration of the search space to be embedded in message to be communicated to the wireless device 100 to enable the wireless device 100 to update its allocated search space.

A particular computer program according to the proposed technology that may be used in an application where the alteration of the search space is based at least partially on information of the data flows directed to and from the wireless device 100 is provided by a computer program 231, 235 for performing, when executed by at least one processor, an alteration of a search space for downlink control information allocated to a wireless device, the computer program comprises instructions, which when executed, cause the at least one processor to:
  determine, based at least partially on information of the data flows directed to and from the wireless device, an alteration of the search space allocated to the wireless device;
  output information specifying the alteration of the search space to be embedded in message to be communicated to the wireless device to enable the wireless device to update its allocated search space.

Figure 14:
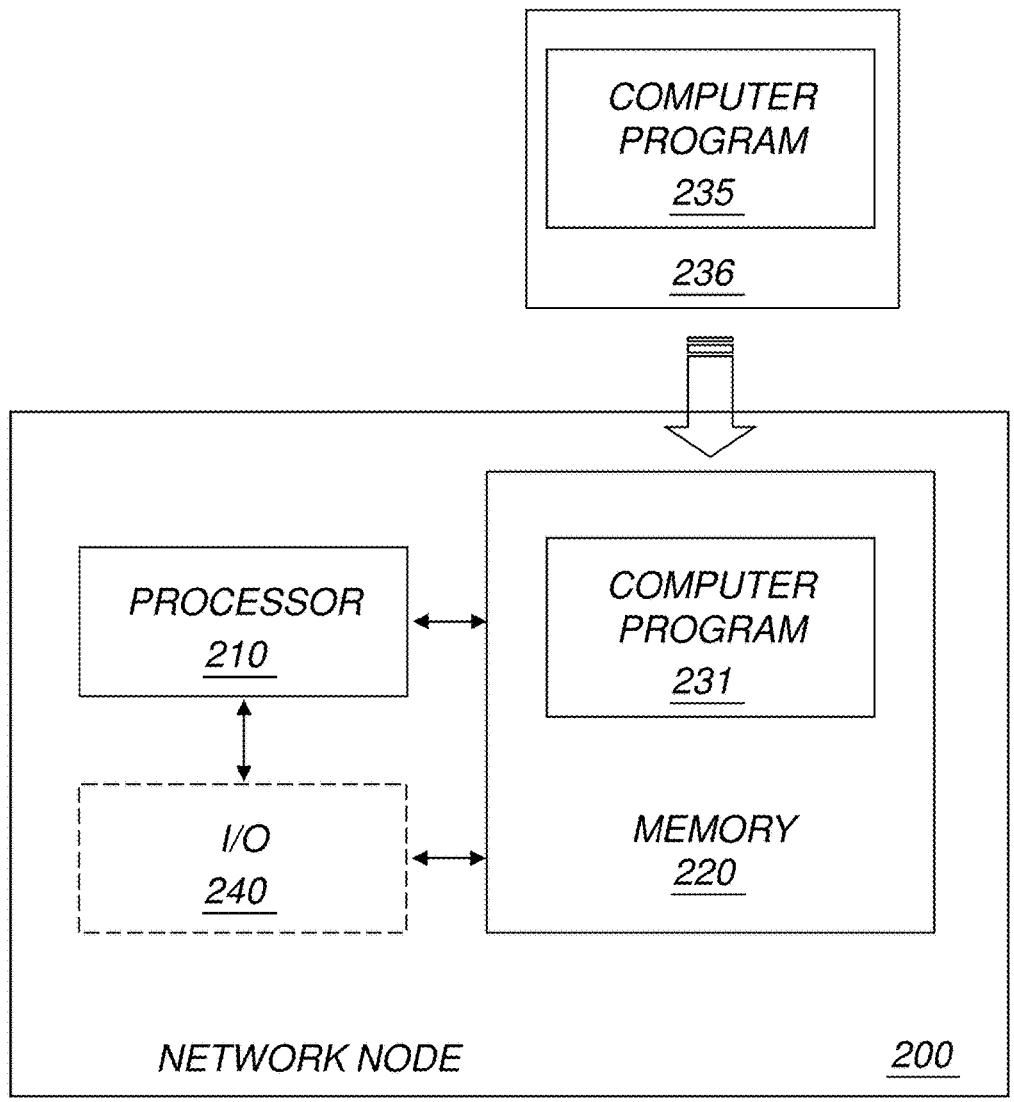
FIG. 14 is a schematic block diagram illustrating a radio network nodes use of a computer program according to the proposed technology.

FIG. 14 illustrates an embodiment wherein a computer program 231 or 235 is executed to perform an alternation of the search space allocated to a wireless device for downlink control information.

The proposed technology also provides a carrier comprising the computer program 231, 235, wherein the carrier is one of an electronic signal, an optical signal, an electromagnetic signal, a magnetic signal, an electric signal, a radio signal, a microwave signal, or a computer-readable storage medium.

By way of example, the software or computer program 231, 235 may be realized as a computer program product 236, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may also be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor. Hence, the apparatus, or the apparatuses, may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such a function module is illustrated in FIG. 15.

Figure 15:
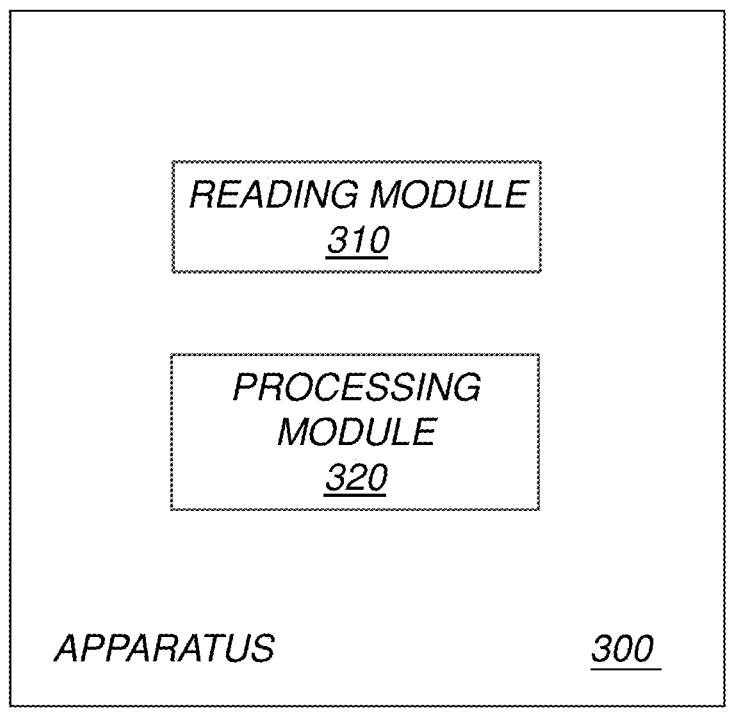
FIG. 15 is a schematic diagram illustrating an apparatus according to the proposed technology.

FIG. 15 provides a block diagram illustrating an apparatus 300 for updating a search space for downlink control information allocated to a wireless device 100. The apparatus 300 comprises:

a reading module 310 for reading information specifying an alteration of the search space in a downlink physical control channel to monitor for downlink control information, DCI; and a processing module 320 for determining an updated search space based on the allocated search space and the specified alteration of the search space.

Such an apparatus 300 may be comprised in the wireless device 100.

Figure 16:
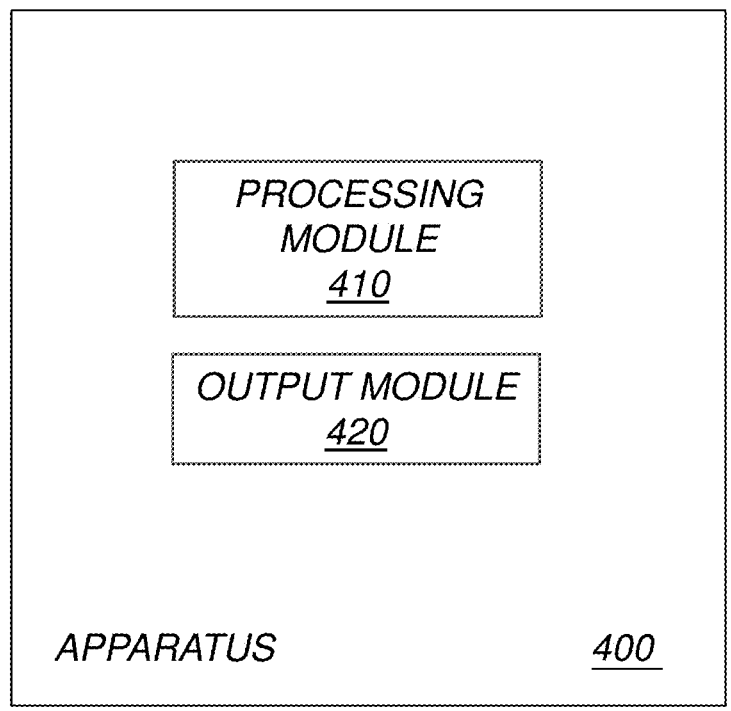
FIG. 16 is a schematic diagram illustrating an apparatus according to the proposed technology.

FIG. 16 provides a block diagram illustrating an apparatus 400 to enable a wireless device 100 to perform an update of a search space allocated to the wireless device 100 to monitor for downlink control information. The apparatus 400 comprises:

a processing module 410 for determining an alteration of the search space allocated to the wireless device 100 an output module 420 for generating information to be communicated to the wireless device 100 specifying the alteration of the search space to the wireless device 100 to enable the wireless device 100 to update its allocated search space.

A particular example of an apparatus 300 according to FIG. 15 is provided by an apparatus 300 for updating a search space for downlink control information allocated to a wireless device. The apparatus 300 comprises:

a reading module 310 for reading information specifying a complementary search space in a downlink physical control channel to monitor for downlink control information, DCI, and a processing module 320 for determining an updated search space based on the allocated search space and the obtained complementary search space.

Such an apparatus 300 may be used in applications where the information relating to the altered search space is provided by means of a complementary search space.

In the same way FIG. 16 provides a schematic block diagram illustrating an apparatus 400 for enabling a wireless device to perform an update of a search space allocated to the wireless device to monitor for downlink control information. The apparatus 400 comprises:

a processing module 410 for determining, based at least partially on information of the data flows directed to and from the wireless device, an alteration of the search space allocated to the wireless device;

an output module for generating information to be communicated to the wireless device specifying the alteration of the search space to the wireless device to enable the wireless device to update its allocated search space.

Such an apparatus 300 may be used in applications where the information relating to the altered search space is determined based at least partially on information of the data flows directed to and from the wireless device 100. The determined information may be processed by the output module to generate information to be incorporated in e.g. a downlink control information message, to be transmitted to the wireless device. This downlink control information may for example be represented by a complementary search space.

Alternatively it is possibly to realize the modules in FIGS. 15 and 16 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It will be appreciated that the methods and devices described herein can be combined and re-arranged in a variety of ways.

For example, embodiments may be implemented in hardware, or in software for execution by suitable processing circuitry, or a combination thereof.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

3GPP Third Generation Partnership Project
eNB Enhanced NodeB
CQI Channel-Quality Indicator
CRS Cell-Specific Reference Symbol
CSI Channel-State Information
CSI-IM CSI Interference Measurement
CSI-RS CSI Reference Symbol
DCI Downlink Control Information
HARQ Hybrid Automatic Repeat-reQuest
LTE Long Term Evolution
MAC Medium Access Control
MCS Modulation and Coding Scheme
MI Mutual Information
MIMO Multiple Input Multiple Output
NDI New Data Indicator
(e)PDCCH (enhanced) Physical Downlink Control Channel
PDU Protocol Data Unit
PMI Pre-coding Matrix Indicator
PRB Physical Resource Block
RI Rank Indicator
RV Redundancy Version
RRC Radio Resource Control
TM Transmission Mode
TTI Transmission Time Interval
UE User Equipment
PDCH Physical Data Channel
dPDCH direct PDCH
rPDCH re-transmittable PDCH
PCCH Physical Control Channel
SPE Search sPace Extension
CCE Control Channel Element
MEM Memory
REG Register
HW Hardware SW Software
ASIC Application Specific Integrated Circuit
FPGA Field Programmable Gate Array
UL Uplink
DL Downlink

The invention claimed is:

1. A method performed by a wireless device for updating an allocated search space to monitor for downlink control information, wherein the method comprises:
receiving, from a base station, a downlink control information message;
obtaining, from the downlink control information message, information specifying an alteration of the allocated search space to monitor for downlink control information, DCI wherein the information specifying an alteration of the allocated search space specifies a complementary search space;
determining an updated search space based on the allocated search space and the information specifying an alteration of the allocated search space; and
using the updated search space to monitor for additional downlink control information;
wherein the information specifying a complementary search space also comprises instructions ordering the wireless device to reduce the allocated search space by removing the specified complementary search space from the allocated search space in order to obtain a reduced search space to monitor for downlink control information.

2. The method according to claim 1, wherein the downlink control information message comprising the information specifying an alteration of the allocated search space is received over a downlink physical control channel.

3. The method according to claim 1, wherein the information specifying an alteration of the allocated search space is obtained from downlink control information comprised in a message received over a downlink physical data channel.

4. The method according to claim 3, wherein the downlink control information message is obtained by decoding a medium access control information element, MAC-element, comprised in the message received over the downlink physical data channel.

5. The method according to claim 1, wherein the information specifying an alteration of the allocated search space comprises information instructing the wireless device to extend the allocated search space to also include search space locations used for downlink control information in earlier Transmission Time Intervals, TTIs.

6. The method according to claim 1, wherein the information specifying an alteration of the allocated search space also comprises information ordering the wireless device to delete the oldest search space location from the allocated search space when the allocated search space has been updated.

7. The method according to claim 1, wherein the updated search space has a validity time for N future Transmission Time Intervals, where N is a standardization, system, or configuration parameter.

8. The method according to claim 1, wherein the allocated search space is a default search space in a downlink physical control channel, the default search space being allocated to the wireless device to monitor for downlink control information.

9. The method according to claim 1, wherein the allocated search space is a search space allocated specifically to the wireless device.

10. A wireless device configured to update an allocated search space to monitor for downlink control information, comprising:
a processor and a memory, the memory comprising instructions executable by the processor whereby the processor is operative to:
receive, from a base station, a downlink control information message;
obtain, from the downlink control information message, information specifying an alteration of the allocated search space to monitor for downlink control information, DCI wherein the information specifying an alteration of the allocated search space specifies a complementary search space;
determine an updated search space based on the allocated search space and the information specifying an alteration of the allocated search space; and
use the updated search space to monitor for additional downlink control information;
wherein the information specifying a complementary search space also comprises instructions ordering the wireless device to reduce the allocated search space by removing the specified complementary search space from the allocated search space in order to obtain a reduced search space to monitor for downlink control information.

11. The wireless device according to claim 10, wherein the wireless device is configured to obtain the downlink control information message comprising the information specifying an alteration of the allocated search space by receiving it over a downlink physical control channel.

12. The wireless device according to claim 10, wherein the wireless device is configured to obtain the information specifying an alteration of the allocated search space from downlink control information comprised in a message received over the downlink physical data channel.

13. The wireless device according to claim 12, wherein the wireless device is configured to obtain the downlink control information message by decoding a medium access control information element, MAC-element, comprised in the message received over the downlink physical data channel.

14. The wireless device according to claim 10, wherein the wireless device is configured to extend the allocated search space by also including search space locations used for downlink control information in earlier Transmission Time intervals, TTIs.

15. The wireless device according to claim 10, wherein the wireless device is configured to delete the oldest search space location from the allocated search space when the allocated search space has been updated.

16. The wireless device according to claim 10, wherein the updated search space has a validity time for N future Transmission Time Intervals, where N is a standardization, system, or configuration parameter.

17. The wireless device according to claim 10, wherein the allocated search space is a default search space in a downlink physical control channel, the default search space being allocated to the wireless device to monitor for downlink control information.

18. The wireless device according to claim 10, wherein the allocated search space is a search space allocated specifically to the wireless device.

19. The wireless device according to claim 10, wherein the wireless device also comprises a communication circuit.

* * * * *